United States Patent [19]

Okata et al.

[11] Patent Number: 4,995,073

[45] Date of Patent: Feb. 19, 1991

[54] COMMUNICATION APPARATUS AND COMMUNICATION SYSTEM HAVING AUTOMATIC ATTRIBUTION SWITCHING

[75] Inventors: Naoyuki Okata, Yokohama; Kazuhiko Yoshioka, Tokyo; Kazutaka Matsueda, Kawasaki, all of Japan

[73] Assignee: Canon Kabushika Kaisha, Tokyo, Japan

[21] Appl. No.: 258,768

[22] Filed: Oct. 17, 1988

[30] Foreign Application Priority Data

| Oct. 10, 1987 | [JP] | Japan | 62-264623 |
| Oct. 19, 1987 | [JP] | Japan | 62-264627 |
| Jan. 8, 1988 | [JP] | Japan | 63-1296 |
| Jan. 8, 1988 | [JP] | Japan | 63-1297 |

[51] Int. Cl.$^5$ ............... H04M 11/06; H04Q 11/04
[52] U.S. Cl. ............... 379/94; 379/100; 370/110.1; 375/5
[58] Field of Search ......... 379/93, 94, 96, 97, 379/98, 100; 370/110.1; 375/5

[56] References Cited

U.S. PATENT DOCUMENTS

| 4,353,097 | 10/1982 | Takeda et al. | 358/257 |
| 4,392,023 | 7/1983 | Sears | 379/98 |
| 4,578,537 | 3/1986 | Faggin et al. | 379/100 |
| 4,596,021 | 6/1986 | Carter et al. | 379/98 |

FOREIGN PATENT DOCUMENTS 0140111 9/1984 European Pat. Off. .
0282158 9/1988 European Pat. Off. .

OTHER PUBLICATIONS

Pandhi, Sushil N., "The Universal Data Connection", IEEE Spectrum, Jul. 1987, pp. 31–37.
"Integrated Services Digital Network", Electrical Communication, vol. 58, No. 1, 1983, pp. 28–31.
Commutation & Transmission, vol. 9, No. 3, Sep. 1987, pp. 35–50, Paris, FR J. L. Lavoisard et al.: "Les Installations Terminales D'Abonnés".
British Telecommunications Engineering; vol. 7, Apr. 1988, pp. 46–57; London, GB, C. G. Davies: "CCITT Signalling System No. 7: Integrated Services Digital Network User Part".
Siemens Telcom Report, vol. 10, No. 1, Jan./Feb. 1987, pp. 23–25, München, DE, H. Beckh et al.: "ISDN-Typische Leistungsmerkmale des Digitalvermittlungssystems EDWS".
IEEE Global Telecommunications Conference, Dec. 2–5, 1985, vol. 1 of 3, Paper 12.5, pp. 363–367, New Orleans, US, L. Chiariglione et al.: "Multimedia Communication at the Basic ISDN Access".
P. Lynhe, et al., "ISDN-A Basis for Enhanced and New Services for the Next Decades", International Switching Symposium 1987, Innovations in Switching Technology, Phoenix, Ariz., Mar. 15–20, 1987, pp. 875–879.

*Primary Examiner*—Jin F. Ng
*Assistant Examiner*—Wing F. Chan
*Attorney, Agent, or Firm*—Fitzpatrick, Cella, Harper & Scinto

[57] ABSTRACT

A communication system, and an apparatus therefor, are used in combination with an integrated service digital network. The proposed system, and the apparatus, can achieve a change of service from an equipment to another, for example from a telephone unit to a facsimile unit, both connected to the same telephone line, without disconnecting a call made through the telephone line. For this purpose, the proposed system or apparatus has a discriminating unit for identifying a request for communication released from another unit connected to the same telephone, and a communication control unit for automatically communicating with a destination unit with which said other unit has been communicating through said telephone line.

15 Claims, 21 Drawing Sheets

FIG. 6
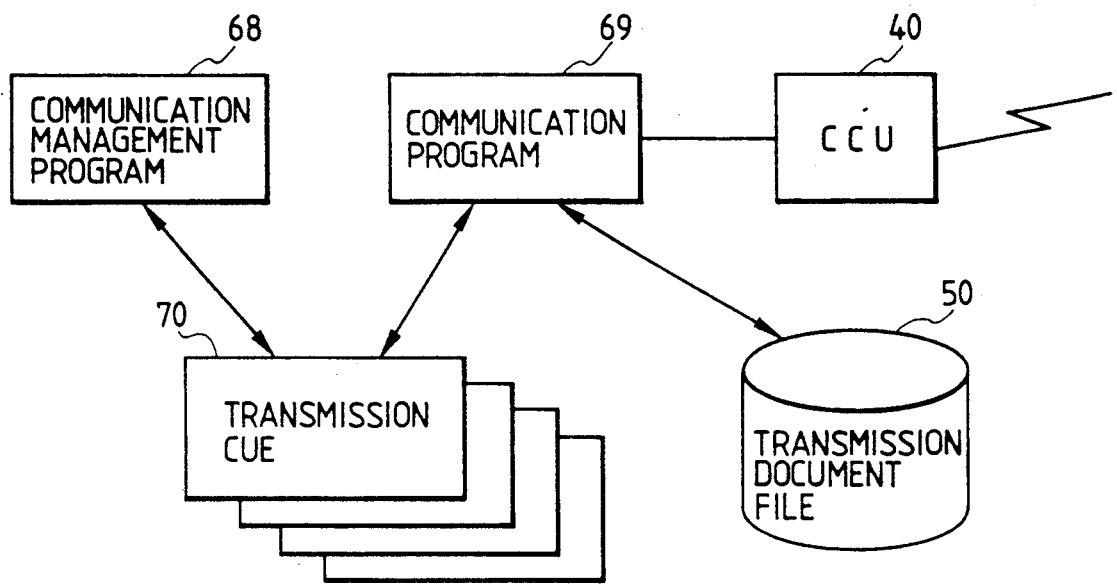
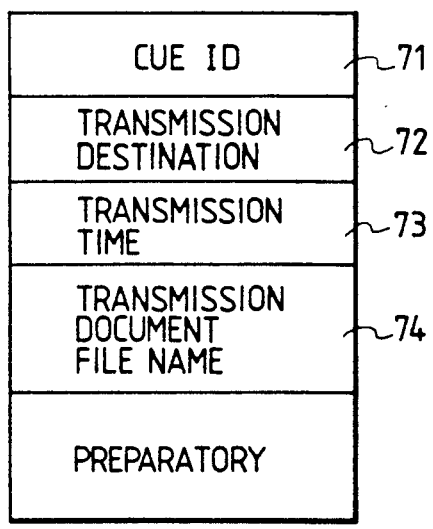
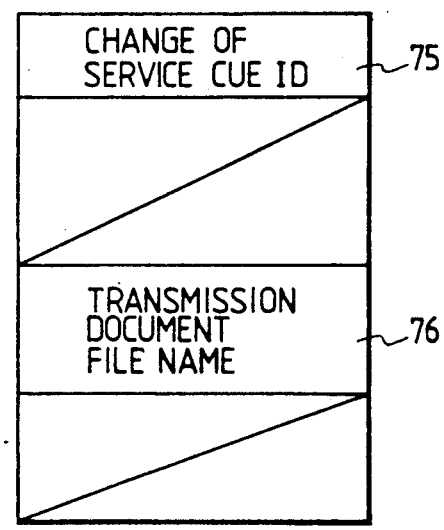

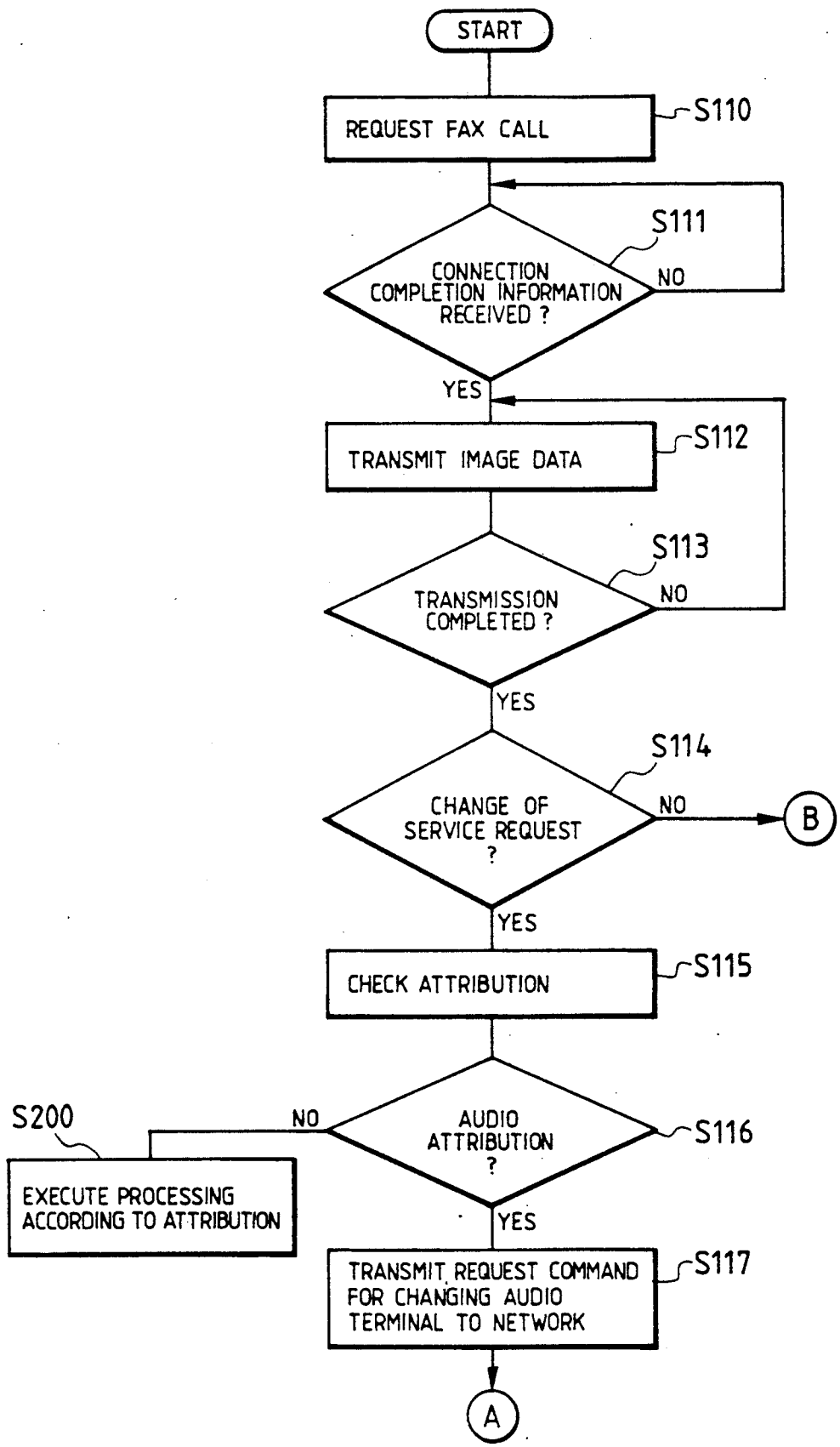

COMMUNICATION APPARATUS AND COMMUNICATION SYSTEM HAVING AUTOMATIC ATTRIBUTION SWITCHING

BACKGROUND OF THE INVENTION

1. Field of the Invention

The present invention relates to a communication system, and an apparatus therefor, for communication of audio or image data, and more particularly to a communication system, and an apparatus therefor, adapted for connection to a digital communication network such as integrated service digital network (ISDN).

2. Related Background Art

One communication apparatus of this kind is known, as disclosed in the U.S. Pat. No. 4,353,097, having a telephone function and a facsimile function and capable of switching from said facsimile function to said telephone function without interrupting the connection between the transmitting and receiving units.

However, in such apparatus, the switching of function is tedious in practice, because, after the selection of switching by the operator, the function has to be switched from the facsimile to the telephone by the operators of the transmitting and receiving units.

Also in case of facsimile communication after telephone communication in such conventional apparatus, the facsimile communication can only be started with a cumbersome procedure, after the switching from the telephone function to the facsimile function, by the actuation of a transmission key by the operator at the transmitting side and the actuation of a reception key by the operator at the receiving side. Besides, the operator can operate the transmission key or the reception key without moving if the telephone function and the facsimile function are incorporated in a single unit, but, if the telephone unit is positioned distant from the facsimile unit, the operator has to move from the location of said telephone unit to that of said facsimile unit in order to operate the key. Such operation is not only cumbersome but also deteriorates the efficiency of communication.

Particularly in an integrated service digital network (ISDN), the user units are often positioned mutually distant, because eight telephone units and data communication units at m can be connected, through a bus-like line in each subscriber's home, to a network terminal (NT) which is in turn connected to a subscriber line. Consequently, in case the connection is switched from a telephone unit to a facsimile unit without interrupting the connection by so-called change-of-service function, known as one of the services available in such ISDN, the operator has to move for operating the transmission key as explained above. Such operation is cumbersome and deteriorates the efficiency of communication.

SUMMARY OF THE INVENTION

An object of the present invention is to eliminate the above-mentioned drawbacks of the prior technology, and to provide a communication apparatus capable of reducing the work required for the operator and improving the efficiency of communication, in case of varying the kind of data to be transmitted without interrupting the call with a destination unit.

Another object of the present invention is to provide a communication apparatus capable of executing the change-of-service function, known as one of services available in the integrated service digital network.

Still another object of the present invention is to provide a communication apparatus capable of transmitting data of different kinds rapidly to the same destination.

Still another object of the present invention is to provide a communication apparatus capable of shifting the communication service to another communication apparatus connected to a same subscriber line and prohibiting in advance that said service is returned to the first-mentioned communication apparatus.

Still another object of the present invention is to provide a communication apparatus capable of displaying that the communication service is shifted to another communication apparatus connected to a same subscriber line.

Still another object of the present invention is to provide a communication apparatus capable of automatically transmitting a voice message after the completion of transmission of data.

The foregoing and still other objects of the present invention will become fully apparent from the following description, which is to be taken in conjunction with the attached drawings.

BRIEF DESCRIPTION OF THE DRAWINGS

FIG. 6 is a schematic view showing a transmission cue;

FIGS. 7A, 7B and 8 are views showing the structure of the transmission cue;

FIGS. 23A and 23B are flow charts showing the control sequence in said fourth embodiment.

DETAILED DESCRIPTION OF THE PREFERRED EMBODIMENTS

Now the present invention will be clarified in detail by embodiments thereof.

At first there will be explained a change-of-service function, which is one of the services available in the integrated service digital network (ISDN). The change-of-service function allows a change in the property of the data to be transmitted (for example audio data in telephony, image data in facsimile, and character data in teletex) without disconnection and re-connection of a call.

In this service, in the course of a call of a telephone unit A to a telephone unit B through the ISDN, if data transmission is desired from a facsimile apparatus at the side of the telephone A to another facsimile apparatus at the side of the telephone B, a service change request is made from the telephone unit A to the ISDN, whereby, after the completion of telephone communication, document data can be transmitted from the facsimile apparatus connected in the same subscriber bus as that of the telephone unit A to the facsimile apparatus connected in the same subscriber bus as that of the telephone unit B, without disconnection and reconnection of the call.

In a conventional system, as explained before, the operator has to select the change-of-service function on the telephone unit, and then to move to the location of the facsimile apparatus for conducting a key operation in such case.

The present embodiment not only eliminates such drawbacks, but also avoids the inconvenience of having to move to the facsimile apparatus and to set the document thereon after the change-of-service function is selected.

Figure 1:
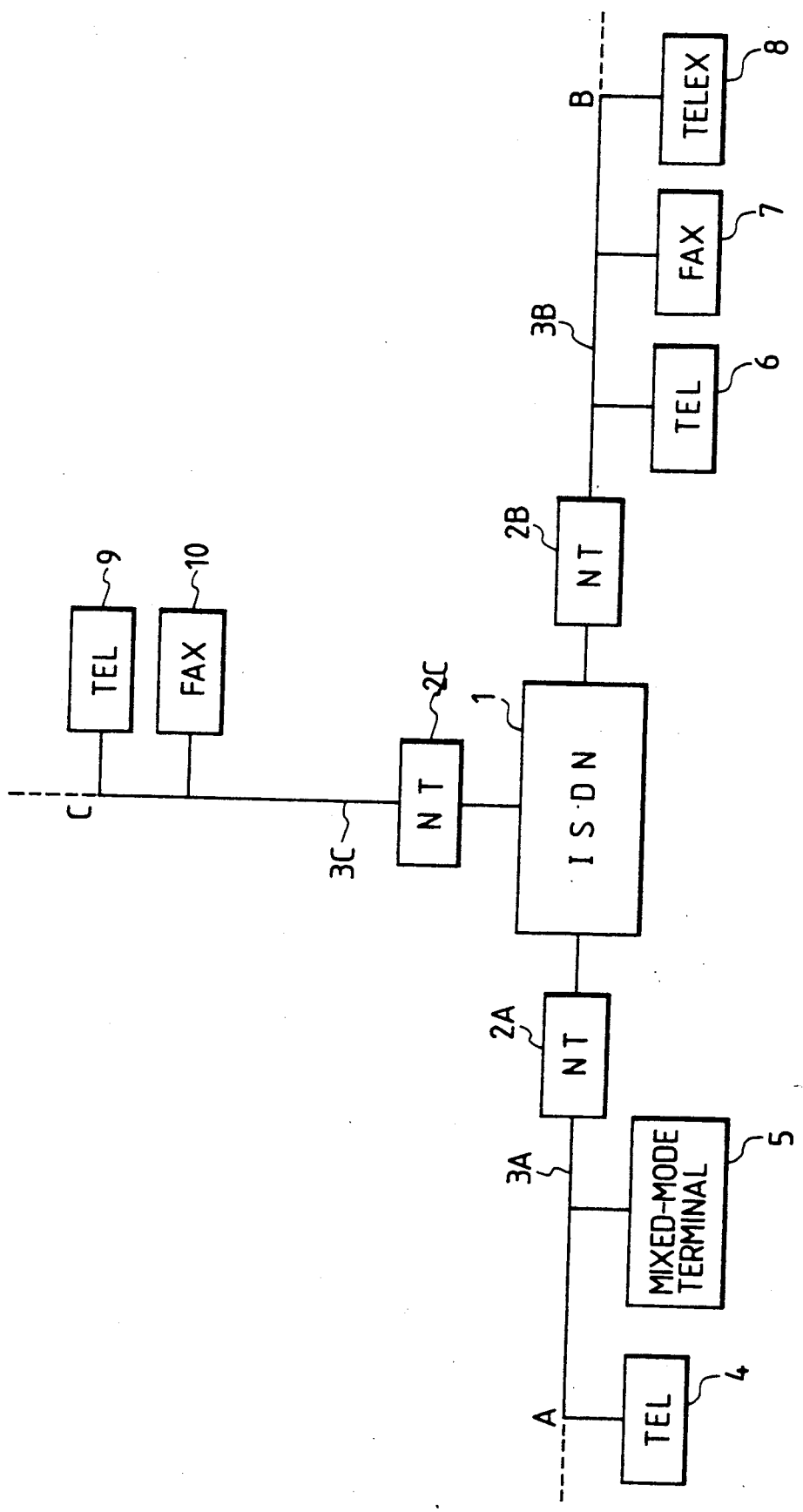
FIG. 1 is a schematic view of an integrated service digital network (ISDN) constituting a first embodiment of the present invention.

In the following there will be given a detailed explanation on an embodiment of the present invention, while making reference to the attached drawings. FIG. 1 is a schematic view of the structure of an integrated service digital network.

In FIG. 1 there are shown an integrated service digital network (ISDN) 1 for effecting exchange services for digital data such as image data, character codes and voice data; network terminals (NT) 2A, 2B and 2C constituting interfaces for connecting the ISDN with bus channels 3A, 3B and 3C each of which is connected to plural terminals such as telephone units, facsimile apparatus, mixed mode terminals etc; digital telephone units 4, 6, 9 respectively connected to the bus channels 3A, 3B, 3C; a mixed mode terminal 5 capable of transmitting and receiving image data and character codes; facsimile apparatus 7, 10; and a teletex unit 8 capable of transmitting and receiving character codes only.

In the present embodiment of the above-explained structure, when the change-of-service function is requested from the telephone unit 4 after the completion of communication between the telephone units 4 and 6, the image data stored in the mixed mode terminal 5 are automatically transmitted to the facsimile apparatus 7.

Figure 2:
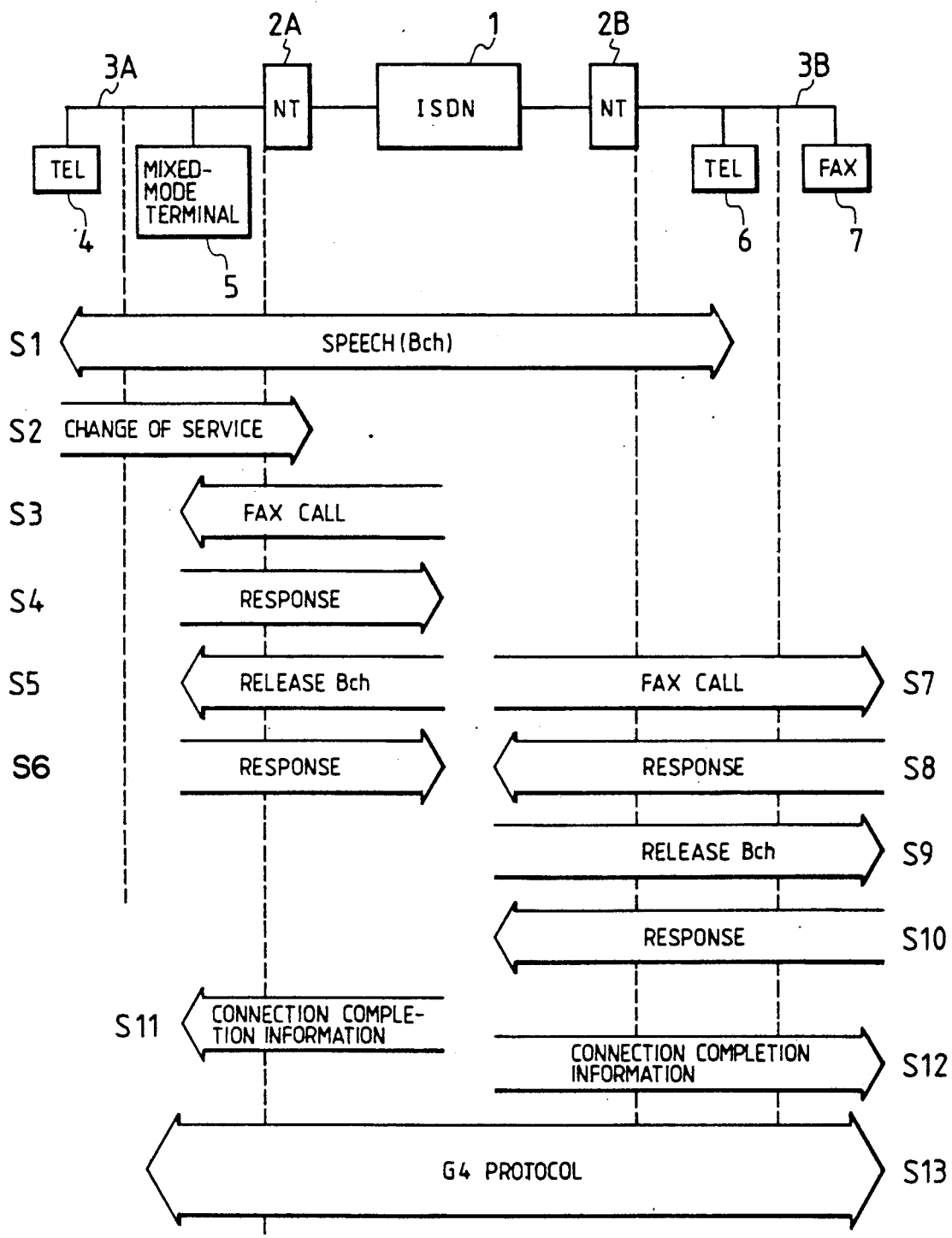
FIG. 2 is a chart showing a connection control procedure of the change-of-service function in said first embodiment.

FIG. 2 shows the sequence when the change-of-service function is requested from the telephone unit 4, wherein same components as those in FIG. 1 are represented by same numbers, and will not be explained further.

At first, in a step S1, telephone communication is made between the telephone units 4 and 6. If transmission of image data is desired, after said telephone communication, from the mixed mode terminal 5 to a terminal on the bus 3B to which the telephone unit 6 is connected, the change-of-service function is requested, in a step S2, from the telephone unit 4. In this step, the transmission of image data is attached as a property (or attribution) of the change-of-service function. In response, in a step S3, the network calls a terminal capable of image data communication. In a step S4, the mixed mode terminal 5 responds to said call. Then, in a step S5, the network informs the mixed mode terminal 5 of liberation the channel B used in the telephone communication, and the mixed mode terminal 5 makes a response thereto in a step S6.

Also at the side of the network terminal 2B, the ISDN similarly makes connection with the facsimile apparatus 7 in steps S7, S8, S9 and S10.

Upon completion of connection, notices of completion of connection are sent to the terminals in steps S11 and S12. Then a G4 protocol is executed in a step S13 between the terminals, and the image data are transmitted from the mixed mode terminal 5 to the facsimile apparatus 6.

Figure 3:
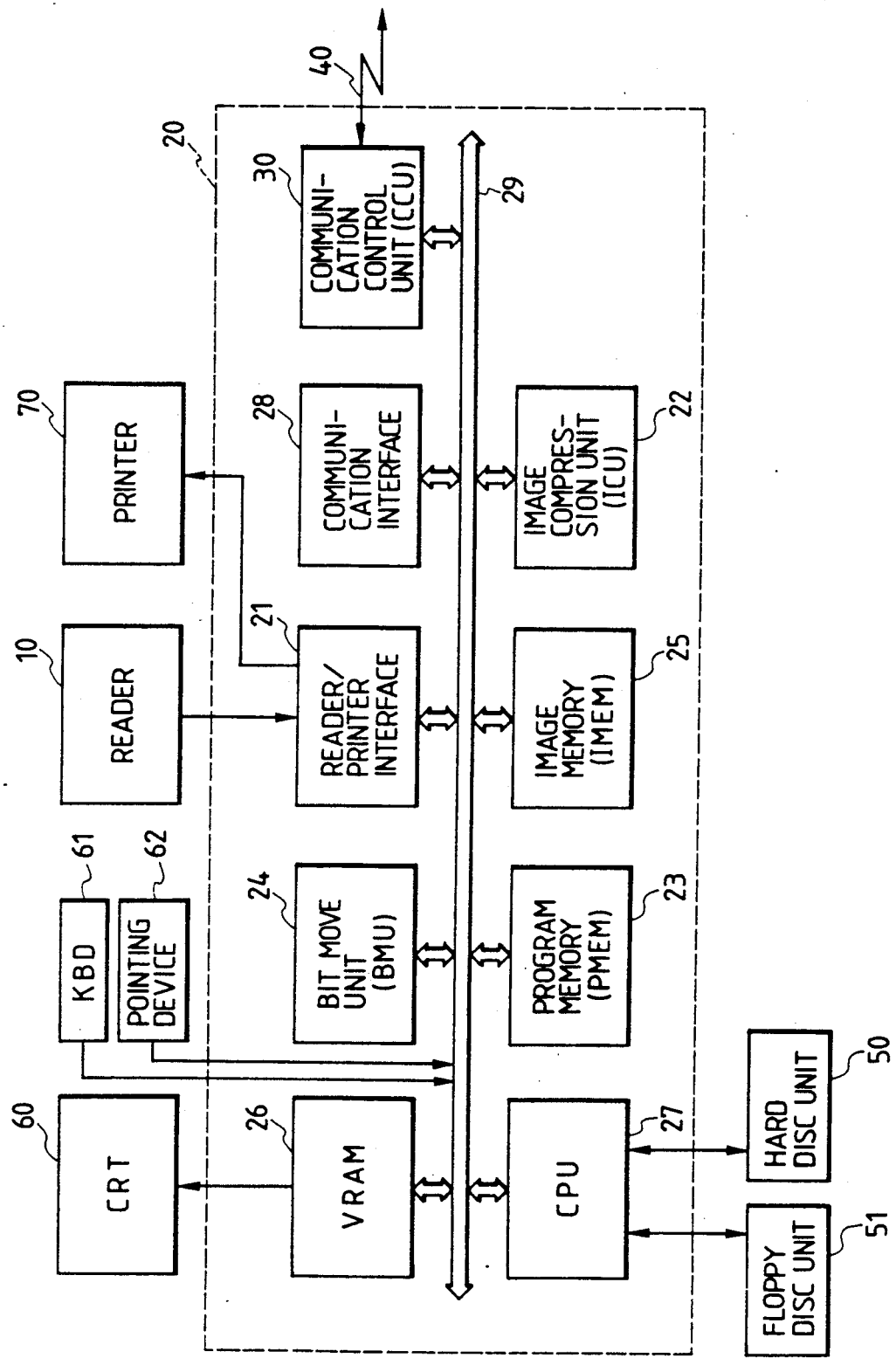
FIG. 3 is a block diagram of a mixed mode terminal in said first embodiment.
Figure 4:
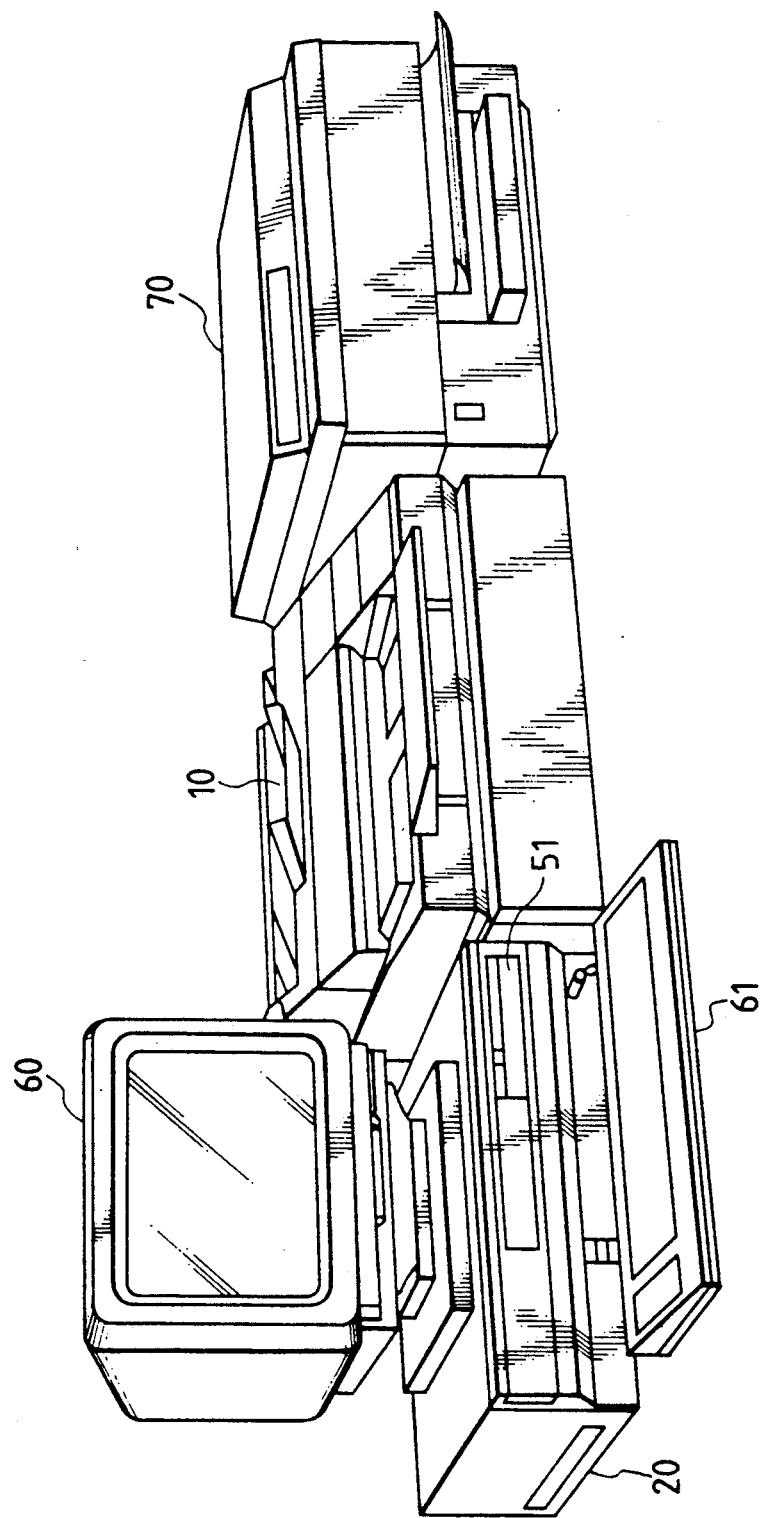
FIG. 4 is a perspective view of the mixed mode terminal in said first embodiment.

FIG. 3 is a block diagram of the details of the mixed mode terminal 5, and FIG. 4 is a perspective view thereof.

A facsimile unit 20 is provided with a reader/printer interface 21: an image compression unit (ICU) 22: a program memory (PMEM) 23 a bit move unit (BMU) 24 an image memory (IMEM) 25; a video RAM (VRAM) 26 a CPU 27 for controlling the entire apparatus; a communication interface 28; a bus 29: and a communication control unit (CCU) 30.

The image compression unit (ICU) 22 is provided for compressing or extending data, and employs two-dimensional compression for increasing the compression rate. The program memory (PMEM) 23 is provided with areas for an OS program and application programs for controlling input/output units provided around the facsimile unit 20 and various units therein, and a font memory area for converting the character codes into image data.

The program memory 23 is also provided with a memory management unit (MMEU), and a work area functioning as a buffer for data transmission from a rigid disk (or disc) to the CCU 30, or from the CCU 30 to the rigid disk, for matching the speed of the rigid disk and the lines.

The bit move unit (BMU) 24 is used for image editing, such as enlargement, reduction, rotation or extraction of an image on a cathode ray tube 60.

The image memory (IMEM) 25 is used for storing image data from a reader, image data edited by the bit move unit 24, data extended by the image compression unit 22, word processor codes composed of key code characters, mixed data or data converted from character codes into image data. In case of mixed data, the storage is made in the form of an image block, a character block with identification codes. The image memory 25 is used also for matching the speeds of the reader 10 and the channel 40 by temporary storage of the data. The video RAM 26 is used for storing image data to be displayed on the cathode ray tube 60 in the form of bit map codes.

As external memories there are provided a rigid disk (or hard disc) unit 50 and a floppy disk (or disc) unit 51. Instead of these non-volatile memories, there may be employed a battery backed-up memory.

A keyboard 61 is used for entering characters and for designating a position on the cathode ray tube 60 by means of a cursor. There are further provided a pointing device 62 and a printer 70.

The mixed mode terminal explained above transmits and receives data consisting of character code data and image data, by dividing the same into character code blocks and image blocks.

Figure 5:
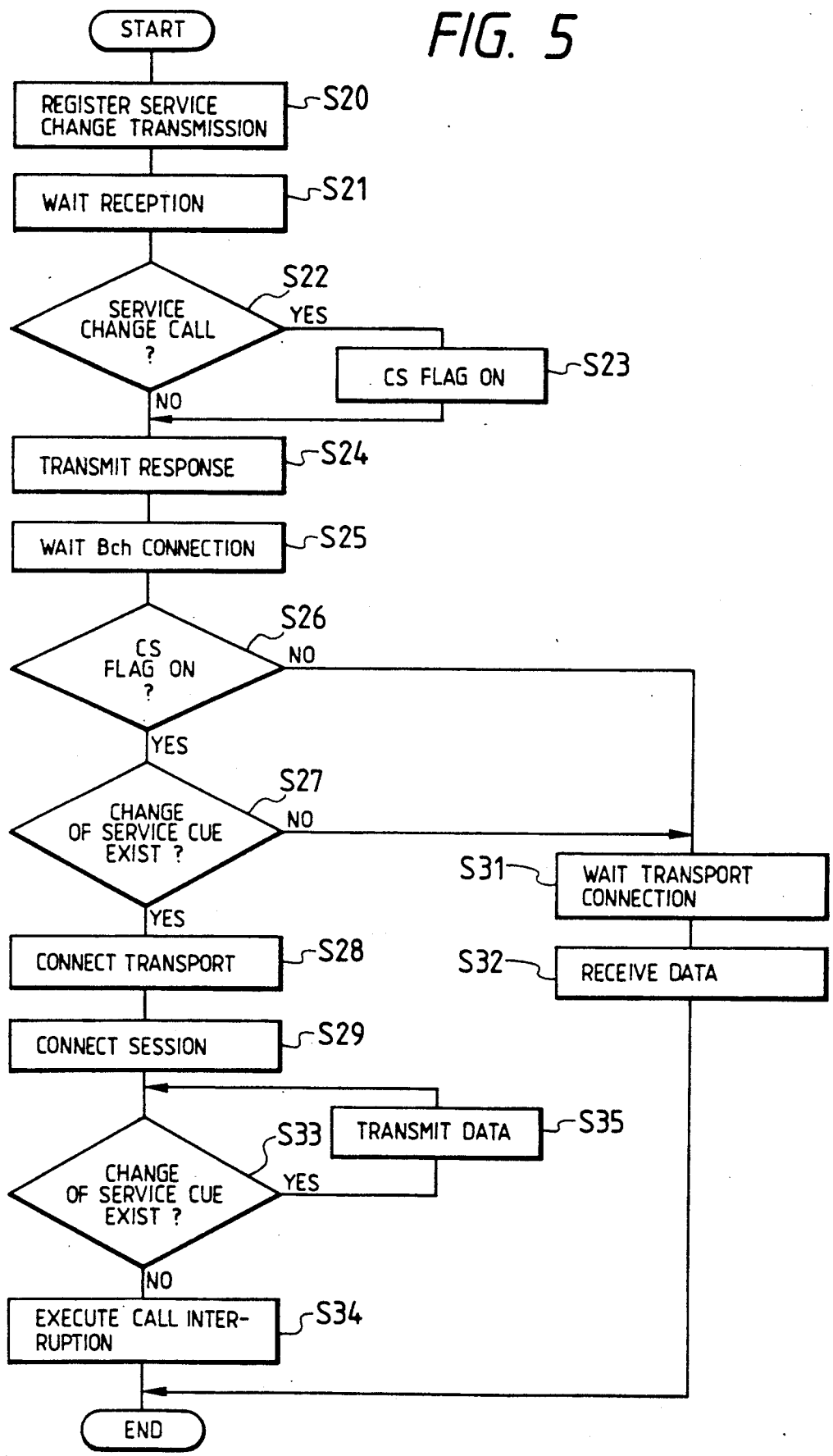
FIGS. 5 and 10 are flow charts showing the control sequence executed by a CPU 27 in said first embodiment.

FIG. 5 is a flow chart showing the control sequence of the CPU 27 in the present embodiment.

In the following there will be given a detailed explanation on the present embodiment, while making reference to FIG. 5.

At first, if the change-of-service function is requested, a step S20 registers the text to be transmitted, as a file on the rigid disk 50. Separately a transmission cue for the change-of-service is registered on the program memory 23.

FIG. 6 shows said transmission cue, wherein programs 68, 69 stored in the aforementioned program memory (PMEM) are controlled by the CPU 27. The communication management program 68 is used for registering the transmission cue 70, and the communication program 69 is used for analyzing the actual communication sequence and the transmission cue 70 for effecting the communication FIG. 7A shows the structure of the transmission cue in an ordinary communication with designated time.

There are shown a cue ID 71 indicating the kind of the transmission cue, identifying a communication with designated time, a polling communication etc.; a transmission destination 72 a transmission time 73; and a transmission document file 74 (in the rigid disk 50).

The transmission program 69 analyzes said transmission cue shown in FIG. 7A, and reads the file of the file name 74 from the file 50 at the transmission time 73, and transmits said file to the destination 72 through the communication control unit 40.

FIG. 7B shows the transmission cue for the change-of-service, including a cue ID 75 indicating the transmission at the change-of-service function, and a transmission document file name 76.

In the registration in the aforementioned step S20, the transmission cue shown in FIG. 7B is registered in the program memory 23, when data for the change-of-service function are selected by the keyboard 61.

Referring to FIG. 5 again, a step S21 awaits the call from the network (S3 in FIG. 2). When a call is received, a step S22 discriminates whether it is a call for the change-of-service function, and, if so, a step S23 sets a CS flag indicating the change of service. Then a step S24 returns a response to said call (S4 in FIG. 2), and a step S25 awaits the connection of the B-channel of the ISDN (S11 in FIG. 2). Upon connection of the B-channel, a step S26 discriminates whether the CS flag has been set, and a step S27 discriminates whether the transmission cue for the change of service has been registered in the program memory 23.

If either of the discriminations turns out negative, a step S31 awaits the connection of transport, and a step S32 initiates ordinary data reception. On the other hand, if the discriminations of the steps S26, S27 turn out affirmative, a step S28 executes transport connection and a step S29 executes session connection. Then the sequence proceeds to a step S33 for discriminating whether the cue for the change of service is present, and, if present, the sequence proceeds to a step S35 for reading the document file name from the transmission cue 76, then reads a document corresponding to said file name from the transmission document file 50 and transmits said document.

The steps S33 and S35 are repeated until the transmission cue for the change of service is cancelled, and the sequence then proceeds to a step S34 for disconnecting the call.

In the above-explained embodiment, since the data to be transmitted at the change-of-service function are stored in advance, it is rendered possible to automatically transmit the data in response to the request for the change-of-service function. This fact simplifies the operation, since the operator can transmit the data by simply selecting the change-of-service function from the telephone unit. Also the use of a transmission cue for the change of service different from the ordinary transmission cue enables storage of the data to be transmitted in the change-of-service function with a simple structure. Also when the change-of-service function is requested, the corresponding data can be securely transmitted to the destination by simply transmitting the data corresponding to said cue.

Also even in case the data to be transmitted at the change of service consist of plural pages or plural documents, the operator at the transmitting side is simply required to store such data in advance. In this manner the operation at the change of service is significantly facilitated, and the efficiency of communication is improved. Though the above-explained embodiment has only one transmission document file 50 (FIG. 6), it is also possible to use separate files such as a file for time-designated transmission, a file for polling transmission and a file for the change of service function, and to transmit all the data in an exclusive file at the change-of-service function.

Figure 8:
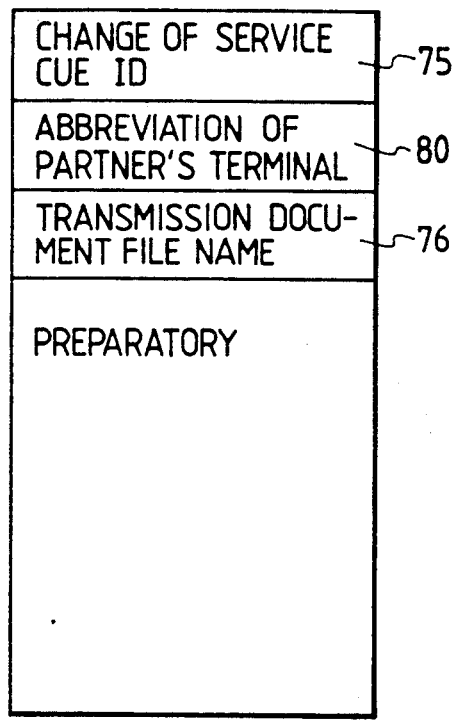

In the following there will be explained a second embodiment in which the data to be transmitted at the change of service are registered with destination identifying data. FIG. 8 shows a transmission cue in such case, which is different from that shown in FIG. 7B, in the presence of an abbreviation 80 of partner terminal.

For using such a transmission cue, at the storage of the data for the change-of-service function in the rigid disk unit 50 in the step S20 shown in FIG. 5, the abbreviation of the partner terminal to which said data are to be transmitted is entered from the keyboard 61.

In this manner it is rendered possible, also in the change-of-service function, to transmit only the data with corresponding abbreviation of the partner terminal.

Figure 9:
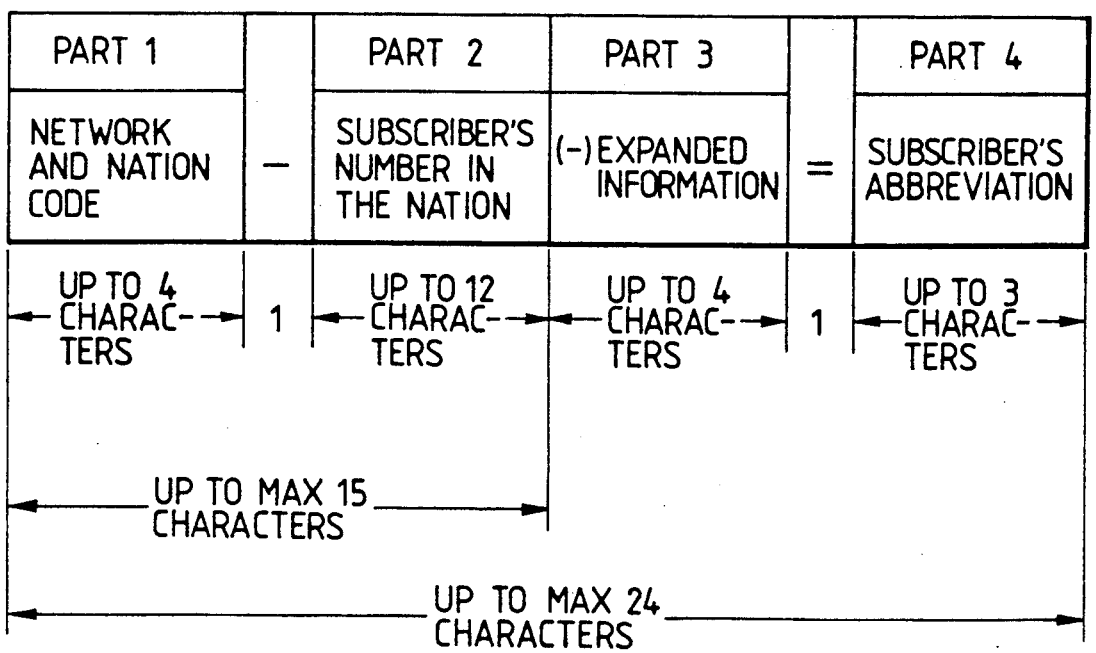
FIG. 9 is a view showing the format of identifying information for the terminal.

In the following there will be explained the abbreviation of the partner terminal. FIG. 9 shows the format of terminal identifying information, which is used as discriminator for the calling and receiving sides. The aforementioned abbreviation corresponds to the abbreviation of subscriber in a part 4 shown in FIG. 9.

The abbreviation of terminal is added as 80 in the transmission cue shown in FIG. 8, and is compared with the discriminator sent from another terminal. This is because, in the session connection (step S29 in FIG. 5), the part 4 shown in FIG. 9 is always sent from the partner terminal but all the parts 1-4 are not necessarily sent.

Figure 10:
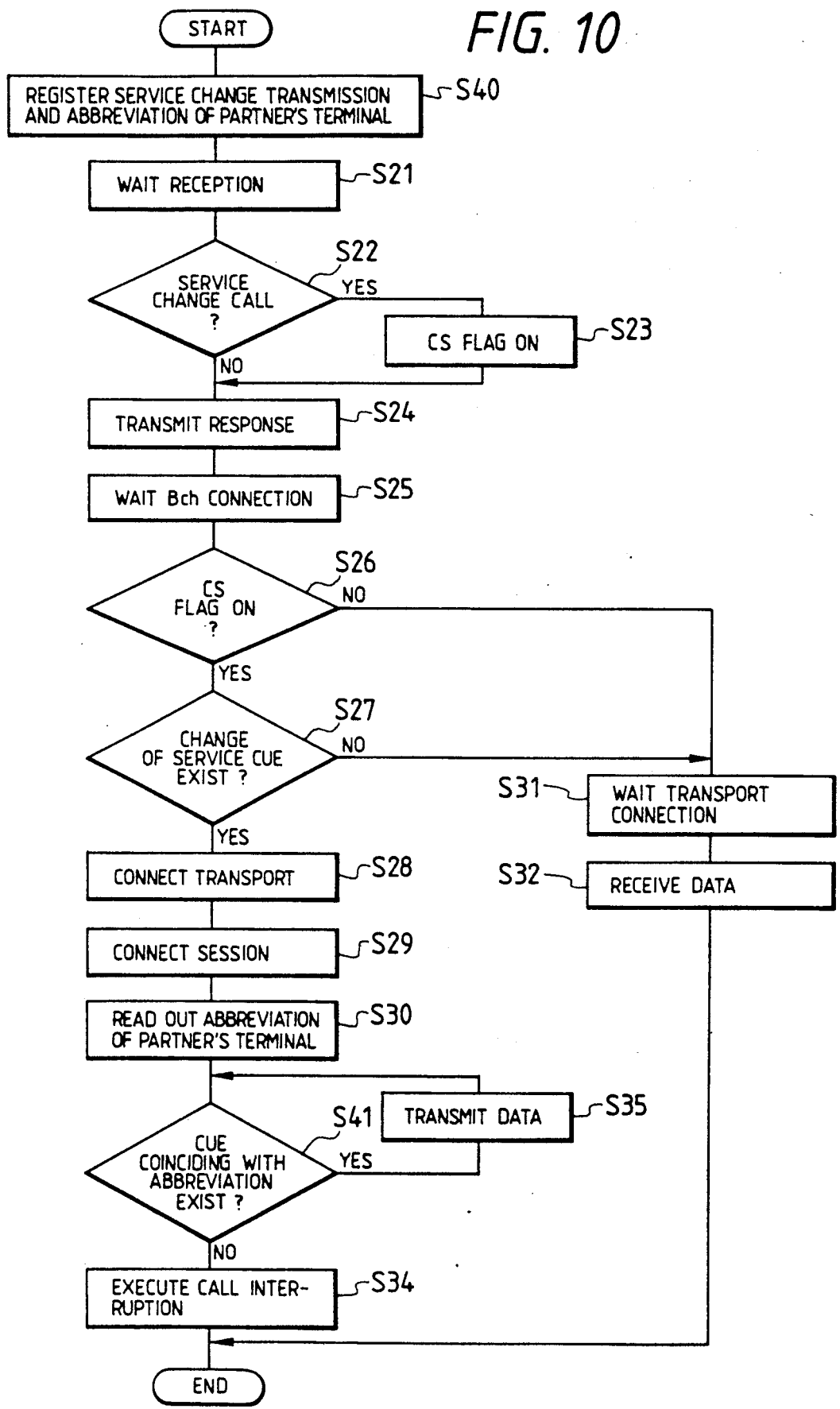

FIG. 10 is a flow chart in the case of transmitting, in response to a request for the change-of-service function, a document for which the abbreviation 80 of the partner terminal in the transmission cue coincides with the abbreviation (part 4) sent from the partner terminal.

The steps same as those in FIG. 5 will be given same numbers and will not be explained further.

At first, in a step S40, at the registration of the data in the rigid disk unit 50, the change-of-service function and the abbreviation of a partner terminal to which the data are to be transmitted are entered from the keyboard 61.

Thus the transmission cue of the format shown in FIG. 8 is registered in the program memory 23.

Subsequently, a step S29 executes a session connection, and exchanges the terminal discriminator with the terminal. A step S30 reads the abbreviation of the partner terminal, and a step S41 searches a transmission cue corresponding to said abbreviation. Then a step S35 reads the data from the rigid disk unit 50 and executes transmission.

As explained in the foregoing, the second embodiment enables transmission only of the document with coinciding terminal abbreviation in the change-of-service function, by registering the data to be transmitted at the change of service, together with the abbreviation of the terminal of destination.

Therefore, if the data for plural terminals are registered in advance together with the corresponding abbreviations, it is rendered possible to transmit the data corresponding to each terminal after the confirmation of the receiving operator, through a simple procedure of informing said operator of the data transmission by telephone and then selecting the change-of-service function.

In the foregoing embodiment, image data are transmitted in the change-of-service function, but character codes can be transmitted in a similar manner. Also the terminal is not limited to the mixed mode terminal but can be a facsimile terminal or a teletex terminal.

In the above-explained embodiment, there is provided memory means for storing data to be transmitted in case data transmission is requested from another terminal connected to a subscriber line of the data communication network, whereby the data stored in said memory means can be automatically transmitted in response to said request, and the operation of the operator in such transmission can be significantly facilitated.

The change-of-service function explained above enables transmission of data of different properties to another subscriber of the network terminal without interrupting a call.

Also in said change-of-service function, in case the service is transferred from a telephone unit to a facsimile terminal, said telephone unit can again receive the service after the completion of the communication of said facsimile terminal. However it is not possible to identify such returning of the service, so that a state of no communication may continue if the handset of the telephone unit is not on the hook.

In the conventional system, therefore, the operator has no way of knowing the revival of the call by such returning of service, so that the call state may endlessly continue after the revival of the call if the telephone unit is in off-hook state when the service is transferred from the telephone unit. Also it has not been possible to terminate, from the partner telephone unit, the call which remains unresponded due to the off-hook state. For this reason the undesired call state may continue and may hinder the communication of other terminals.

The following embodiment, for resolving the above mentioned drawbacks, enables the announcement of the revival of the service, thereby allowing the operator to recognize such revival of service. Also it enables to disconnection of a call by the operation of one side only, Said embodiment will be explained in the following, with reference to the attached drawings.

Figure 11:
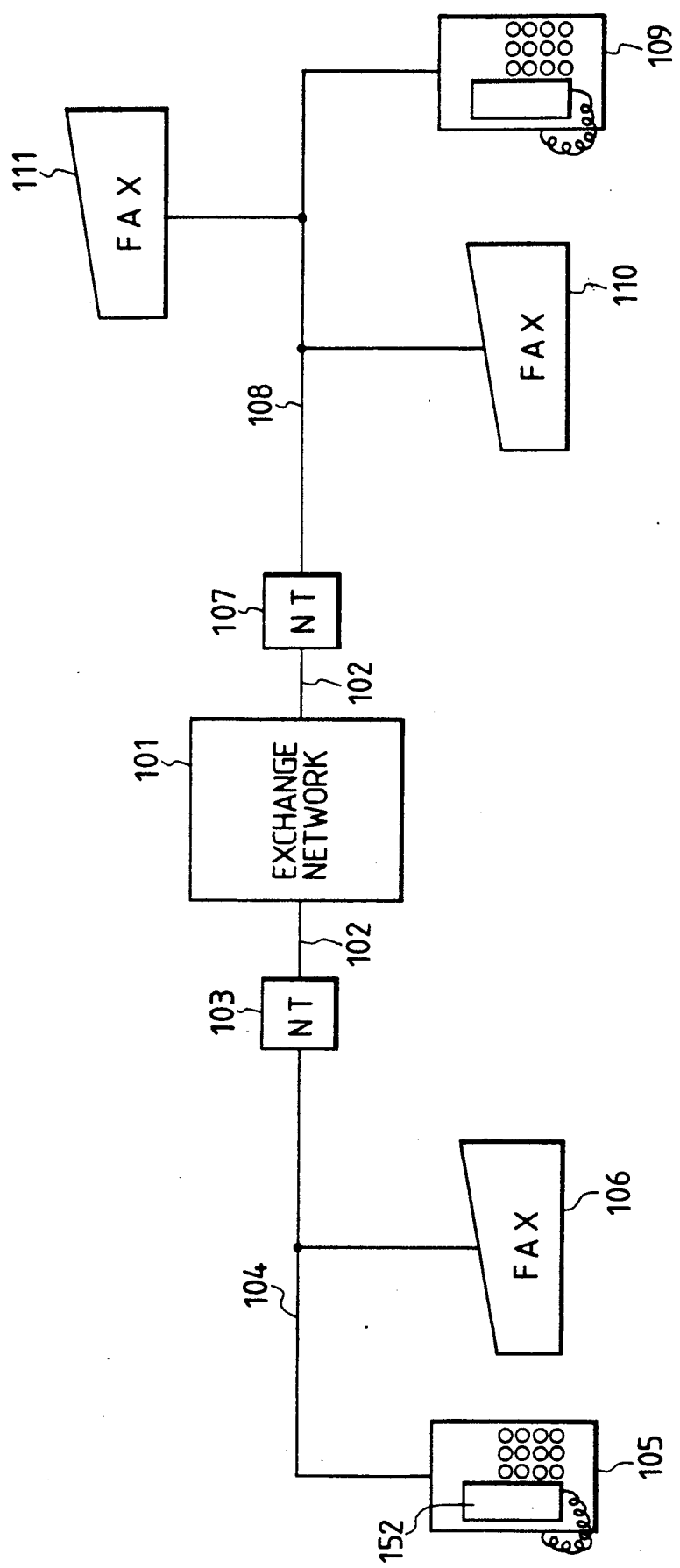
FIG. 11 is a block diagram of a second embodiment of the present invention.

FIG. 11 is a schematic view of an ISDN constituting an embodiment of the present invention. Said ISDN of the present embodiment has an interface structure defined for example according to CCITT SG XVIII.

In FIG. 11 there are shown an exchange network 101; digital subscriber lines 102 network terminals (NT) 103, 107; buses 104, 108 each connectable to eight terminals at maximum a telephone unit 105 of the data transmitting side a facsimile apparatus 106 constituting a data transmitting unit to be subjected to the change-of-service function by the telephone unit 105: a telephone unit 109 of the receiving side for communicating with the telephoneunit 105: and facsimile apparatus 110, 111 constituing data receiving units for receiving the data from the facsimile apparatus 106.

In the ISDN, plural terminals can be connected to a network terminal. Also in the present embodiment, plural terminals are connected to each of the buses 104, 108.

Figure 12:
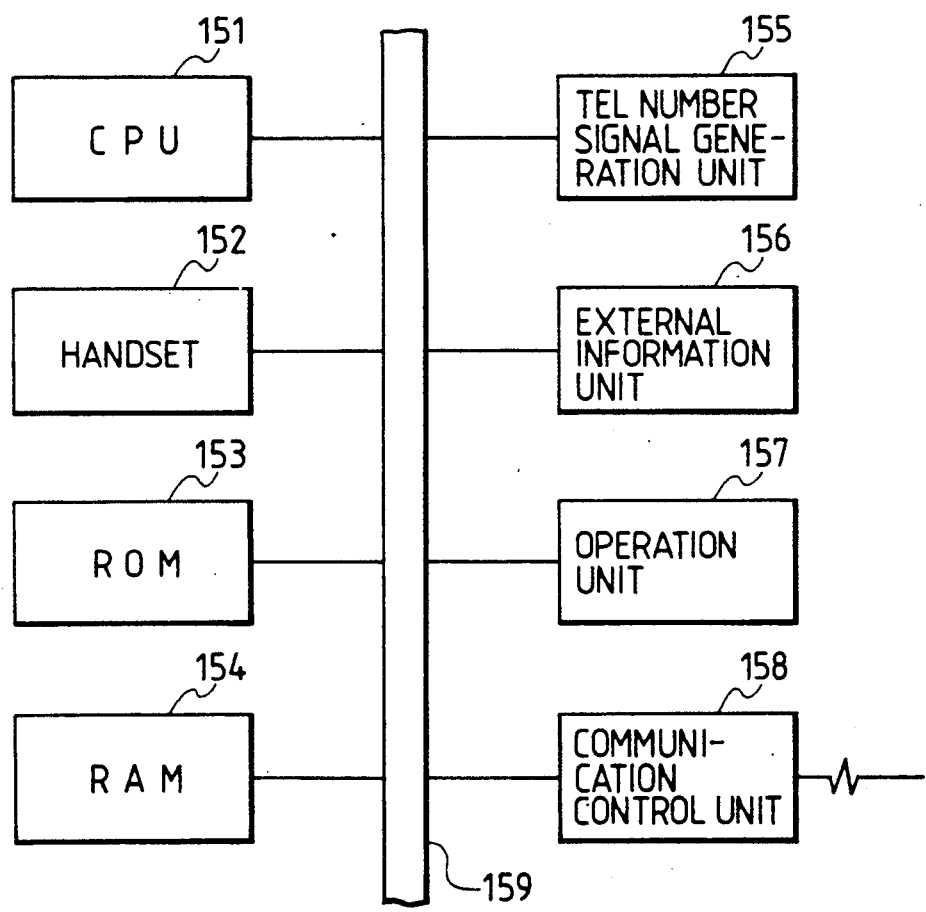
FIG. 12 is a detailed block diagram of a telephone unit shown in FIG. 11.

FIG. 12 shows the details of the telephone units 105, 109 in the present embodiment.

Figure 14:
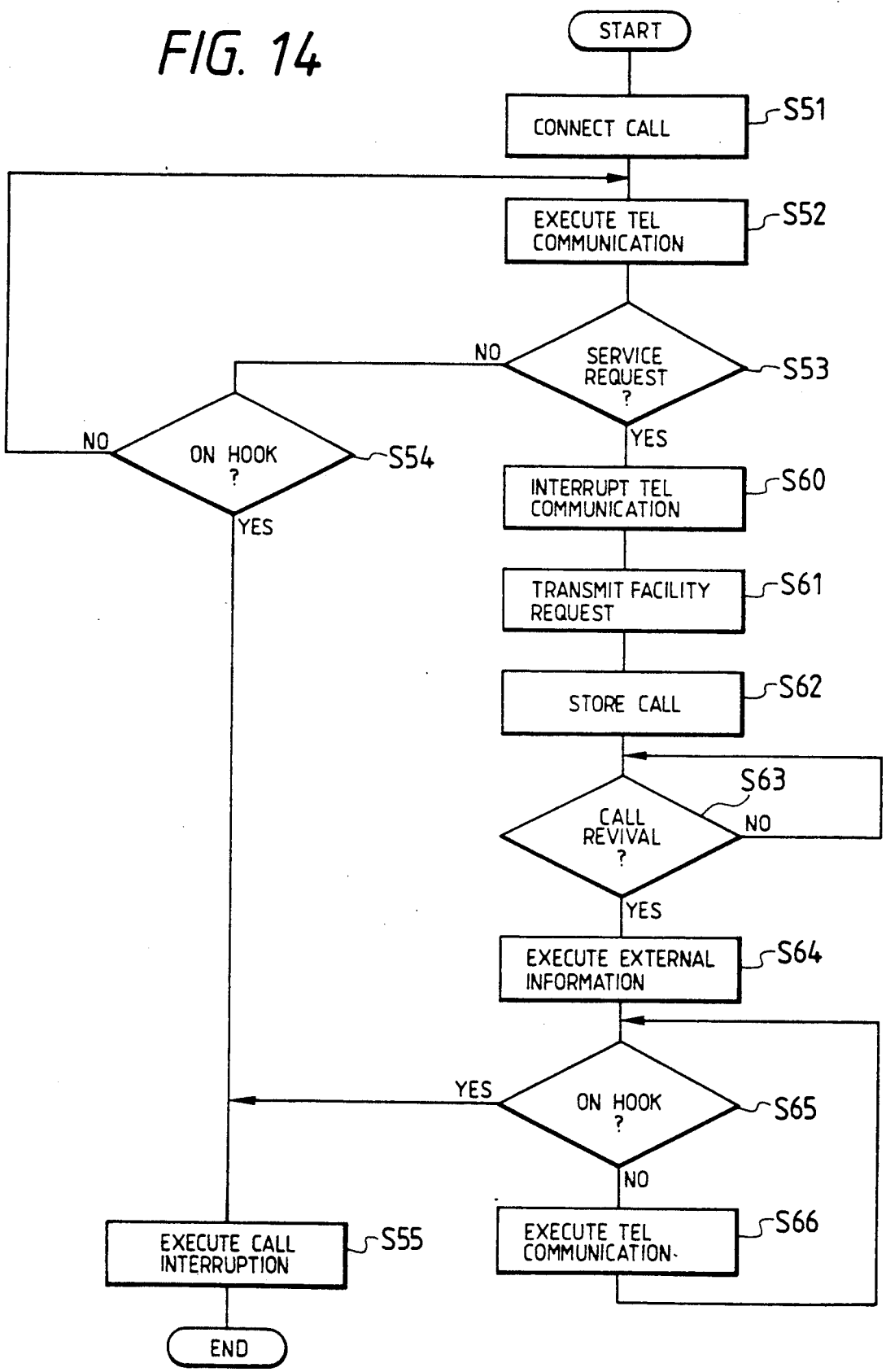
FIGS. 14 and 15 are detailed flow charts of the change-of-service function in the second embodiment.

In FIG. 12, there are shown a CPU 151 for controlling the entire telephone unit according to a program stored in a ROM 153 as shown in FIG. 14, thereby executing the communication control in the ISDN; a handset 152; a ROM 153 for storing the above-mentioned program and other parameters; a RAM 154 for storing the results of processing of the CPU 151; a telephone number signal generating unit (ACU) 155 for releasing telephone number signals in response to the input of a telephone number from an operation unit 157; an external information unit 156 for informing the user of the revival of a cell in the change-of-service function; an operation unit 157 provided with telephone number keys, a key for requesting the change of service etc.; a communication control unit 158 for controlling the communication with the ISDN through the network terminal 103 or 107; and a bus 159 connecting various components.

The facsimile apparatus 106, 110, 111 shown in FIG. 11 are ordinary ones connectable to the ISDN and will not be explained in detail.

Now reference is made to FIGS. 13A to 13E for explaining the change-of-service control in the present embodiment explained above.

In the ISDN, it is possible, during a telephone communication service between telephone units, to switch said service and to transmit image data or text data to the same destination. In such case, a request for change of service is given to the network from the telephone unit in the communication service, and, in response to said request, the network suspends the telephone communication service and newly sets a call between the facsimile apparatus. The facsimile apparatus having a document to be transmitted selects the data transmission, thereby effecting the data communication.

During this operation, the communication channel between the telephone units is maintained in the suspended state, and, upon completion of the data communication between the facsimile apparatus, the exchange unit of the network cancels said suspended state, thereby enabling the telephone communication again. During this period, the telephone units also maintain the off-hook suspended state. If said suspended state of the telephone units is retained, the external information unit 156 of the telephone unit is energized when the call is revived, thereby lighting a display indicating the revival of the call, and giving an alarm sound for example by a bell. In response to said display, the users can continue conversation by the revived call, and, upon termination of the communication, liberate the channel by placing the handset on the hook.

Also in the present embodiment, if the handset 152 of the telephone set is returned to the hook during the aforementioned suspended state of communication, the communication is automatically cut off when the call is revived. Therefore, if telephone communication is not necessary after the suspended state, the handset 152 can be returned to the hook to cancel the revival of the call. In this manner the telephone communication can be terminated without waiting the revival of the call.

FIGS. 13A to 13E show the sequence in the change-of-service process in the transmitting and receiving terminals and the network.

Figure 13A:
FIGS. 13A to 13E are views showing the sequence of the change-of-service function in the second embodiment.
Figure 13B:
Figure 13C:
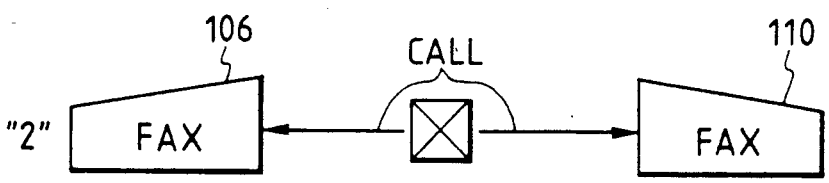
Figure 13D:
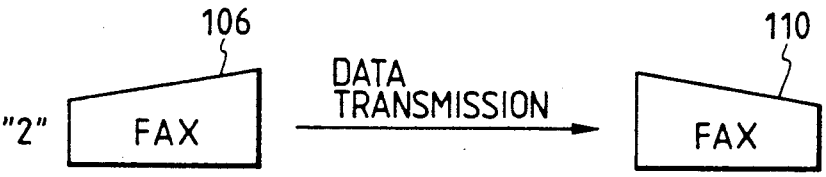
Figure 13E:

FIG. 13A shows the telephone communication state between the telephone units 105 and 109. In this state the call number specific to the ISDN is assumed to be "1". When the change of service is requested in this state by the transmitting side and/or the receiving side, a facility request command is sent to the network as shown in FIG. 13B. In this state the call number "1" is retained, and is then changed to a new call number "2" as shown in FIG. 13C. The facility request shown in FIG. 13B contains a parameter indicating the facsimile apparatus, and, in response, the network 101 makes a call and a connection to the facsimile apparatus. Calls are simultaneously made to the facsimile apparatus 106, 110 thereby establishing a communication channel therebetween. In a state shown in FIG. 13D, the data transmission is carried out by the apparatus having a document to be transmitted, or by the side that has selected the change of service. Upon completion of the data communication, the suspended call number "1" is revived as shown in FIG. 13E, whereby the communication between the telephone units 105, 109 is restored. However, if the handset of the telephone unit is returned to the hook, the call is not revived and the communication is terminated.

Now reference is made to a flow chart shown in FIG. 14, for explaining the details of the communication control in the present embodiment explained above. Said flow chart indicates a control sequence to be executed by the telephone unit 105 or 109.

In a step S51, the calling side enters a destination telephone number by actuating telephone number keys (or turning a dial) of the operation unit 157. The telephone number signal generating unit 155 generates telephone number signals (DTMF signals or dial pulse signals) corresponding to the entered telephone number, thereby establishing a call between the terminals (for example between the telephone units 106 and 109). At the same time, the network 101 sets a call number for this call.

Thus the communication is enabled, and the telephone communication between the telephone units is executed in steps S52 to S54. The step S53 discriminates whether the change of service, for example the communication between the facsimile apparatus, is desired from either or both of the telephone units, and the step S54 discriminates whether the communication is terminated by the returning of the handset 152 to the hook. In the absence of the request for the change of service and the returning of the handset to the hook, the sequence returns to the step S52. On the other hand, in the presence of a request for the change of service, the sequence proceeds to a step S60.

The step S60 interrupts the telephone service, whereby the communication between the telephone units is disabled. In a succeeding step S61, the transmitting telephone unit 105 sends the facility request command, with a parameter for the change of service, to the network 101. Then a step S62 causes the RAM 154 to store the call number, in preparation for the revival of call. Then a step S63 inspects the termination of the facsimile communication, or the revival of call, and, in response to the termination of the facsimile communication informed from the network 101, the sequence proceeds to a step S64, which, in response to the information from the network 101, energizes the external information unit 156, thereby displaying the revival of call and generating a sound for example of a bell. Then a step S65 discriminates whether the handset 152 is on hook or off hook. If it is in the off-hook state, indicating the intention to continue the telephone communication, the sequence proceeds to a step S66 for retaining the communication state, and then returns to the step S65. This state is retained until the handset is returned to the hook.

On the other hand, if the step S65 discriminates that the handset 152 of the telephone unit is returned to the hook, indicating the absence of necessity for the revival of call, the sequence proceeds to a step S55 for executing a call disconnecting process such as liberating the channel, thereby terminating all the process.

Figure 15:
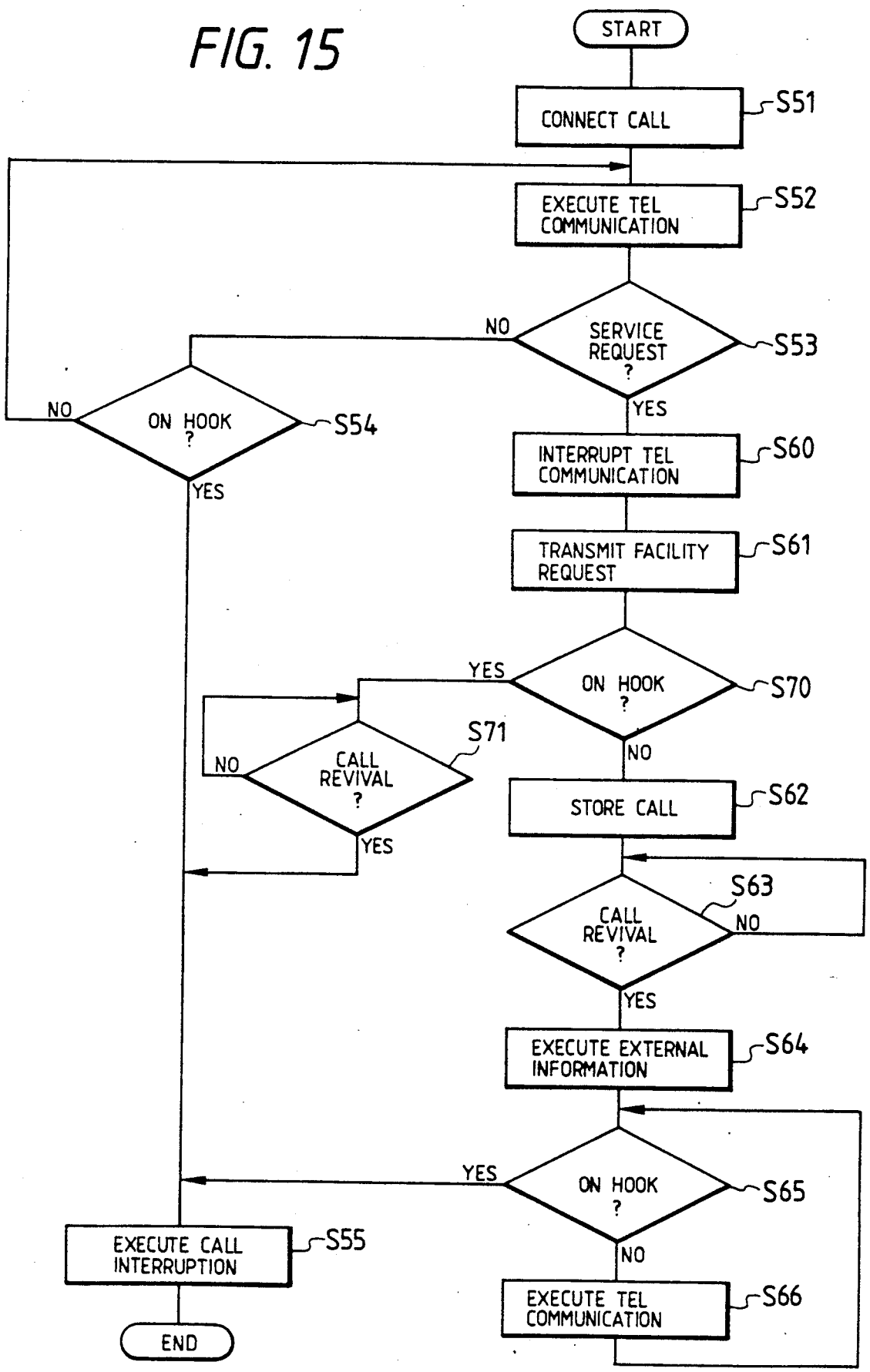

FIG. 15 shows a modification on the embodiment shown in FIG. 14, and same steps as those in FIG. 14 are represented by same numbers and will not be explained further.

Referring to FIG. 15, a step S70 discriminates, after the release of the facility request for the change of service, whether the handset 152 is on the hook or not. If it is on the hook, indicating the absence of necessity for the revival of call after the termination of the facsimile communication, the sequence proceeds to a step S71 which discriminates whether the call has been revived. If it is revived, the sequence proceeds to a step S55 for disconnecting the call without external information. If the handset 152 is off the hook in the step S70, indicating the necessity of revival of the call after the termination of the facsimile communication, the sequence proceeds to a step S62.

As explained in the foregoing, the communication apparatus of the present embodiment is provided with a function of informing the user with the revival of call in the change-of-service function, and a function of requesting disconnection at the revival of call, thereby enabling the user to recognize the revival of call or allowing the communication to be terminated without the revival of call. In this manner the operation required in the change-of-service function can be simplified.

Also in the present embodiment the communication can be disconnected from the one side only, so that there can be prevented a situation in which the communication is continued due to the absence of response from the partner telephone unit, thus hindering other communications.

In the following there will be explained another embodiment, in which, when the communication is transferred from a telephone unit to a facsimile apparatus by the change-of-service function, the telephone unit can display that the change-of-service function is in progress.

Figure 16:
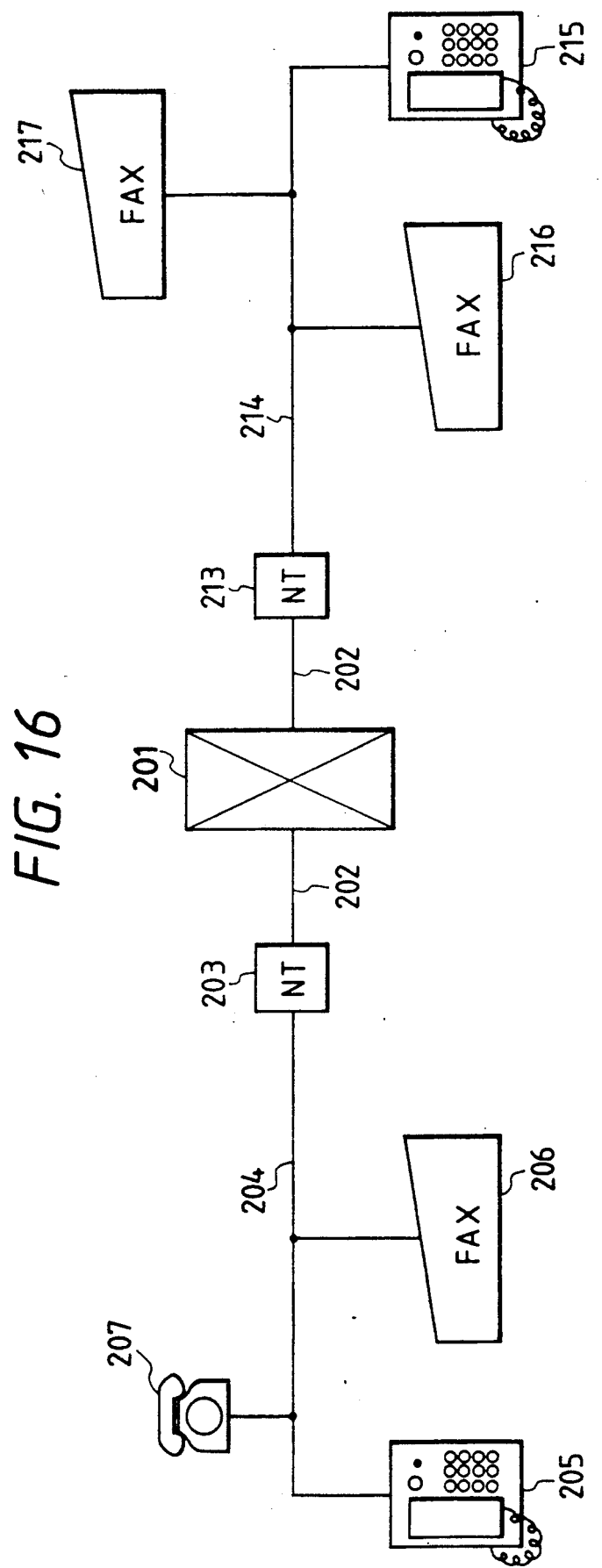
FIG. 16 is a block diagram of a third embodiment of the present invention.

FIG. 16 is a schematic view of an ISDN having, in the present embodiment, an interface structure defined according for example to CCITT.SG XVIII.

In FIG. 16, there are shown an ISDN 201; digital subscriber lines 202; network terminals 203, 213; buses 204, 214 each connectable to eight terminals at maximum; a telephone unit 205 of the data transmitting side: a facsimile apparatus 206 constituting a data transmitting apparatus subjected to the change-of-service function by the telephone unit 205; another telephone unit 207 a telephone unit 207 of the receiving side communicating with the telephone unit 205; and facsimile apparatus 216, 217 of the receiving side for receiving the data from the facsimile apparatus 206.

In the ISDN, plural terminals can be connected to each network terminal, and, also in the present embodiment, plural terminals are connected to each of the buses 204, 214.

Figure 17:
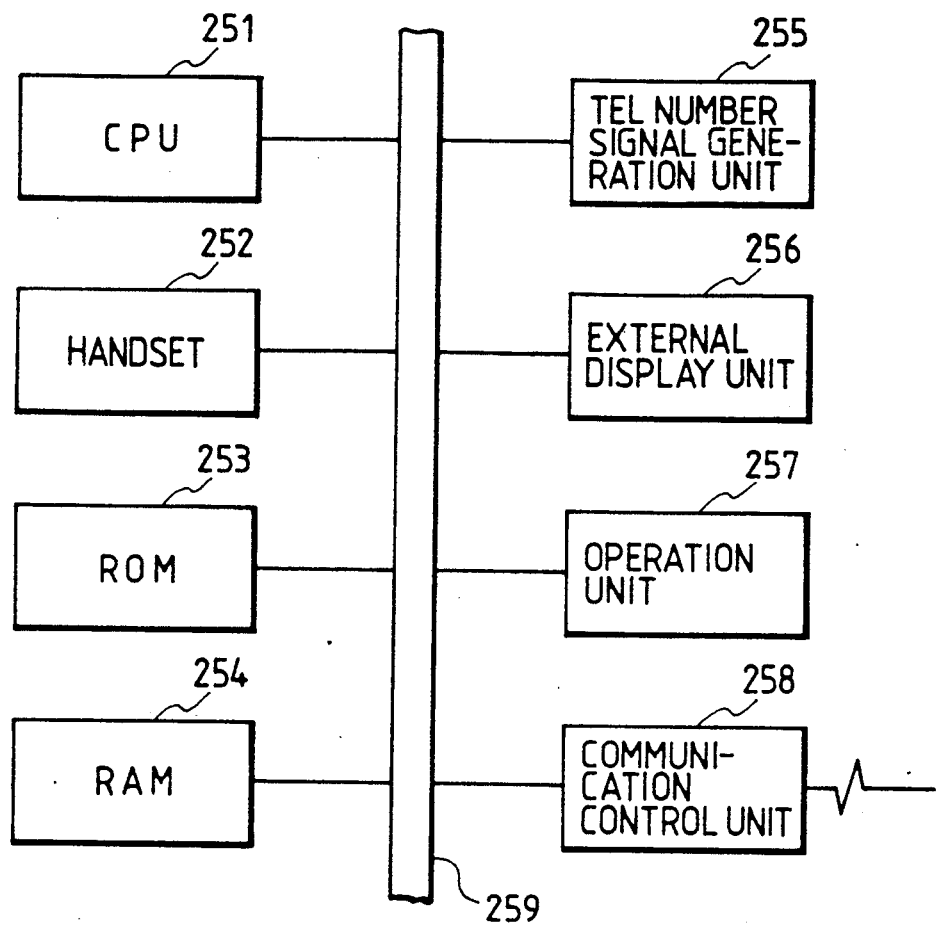
FIG. 17 is a detailed block diagram of a telephone unit shown in FIG. 16.

FIG. 17 shows the details of the telephone unit 205 or 215.

Figure 20:
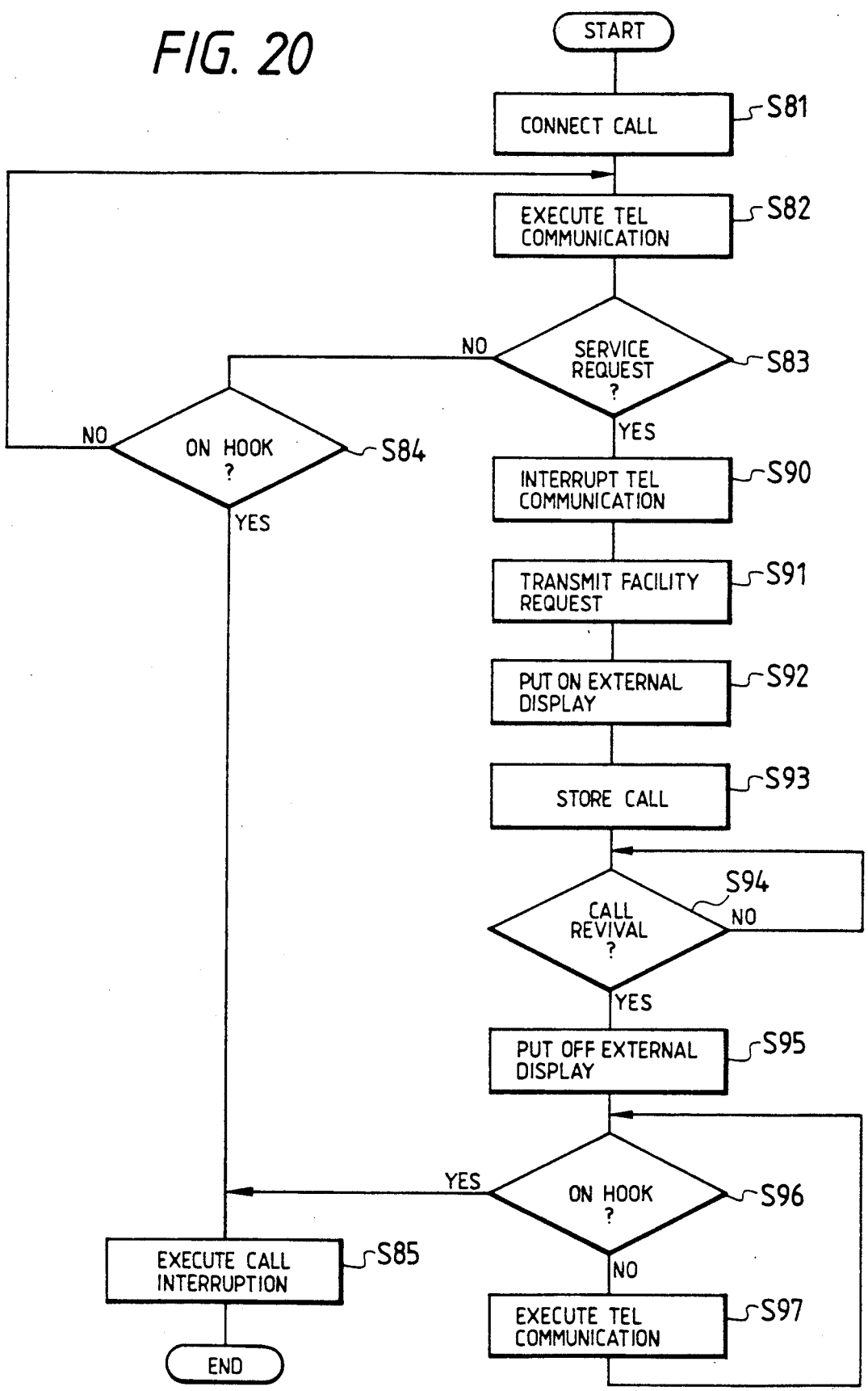
FIG. 20 is a detailed control flow chart of the change-of-service function in the third embodiment.

In FIG. 17, there are shown a CPU 251 for controlling the entire telephone unit according to a program stored in a ROM 253 as shown in FIG. 20, thereby executing the communication control in the ISDN: a handset 252: a ROM 253 for storing the above-mentioned program and other parameters: a RAM 254 for storing the results of processing of the CPU 251: a telephone number signal generating unit (ACU) 255 for releasing telephone number signals in response to the input of a telephone number from an operation unit 257; an external information unit 256 provided with a service change lamp 256b for indicating that the transfer of service is in progress by the change-of-service function to be explained later; an operation unit 257 provided with telephone number keys 257b, change-of-service request key 257a etc.; a communication control unit 258 for controlling the communication with the ISDN through the network terminal 203 or 207: and a bus 259 connecting various components.

Figure 18:
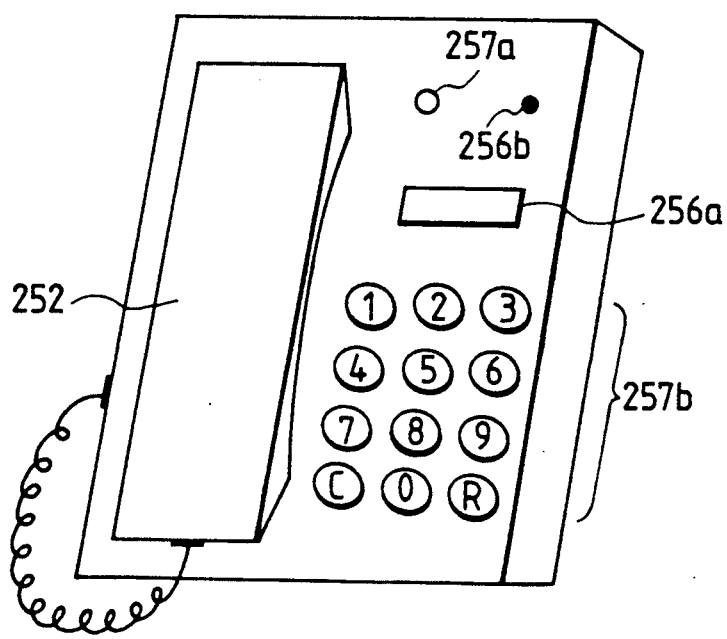
FIG. 18 is an external view of the telephone unit shown in FIG. 17.

FIG. 18 is an external view of said telephone unit, wherein said components as those in FIG. 17 are represented by same numbers. There are illustrated a display unit 256a for displaying various information: a service change lamp 256b; a change-of-service request key 257a; and telephone number keys 257b.

The facsimile apparatus 206, 216, 217 shown in FIG. 16 are ordinary ones connectable to the ISDN and will not be explained in detail.

Now reference is made to FIGS. 19A to 19E for explaining the change-of-service control in the present embodiment explained above.

In the ISDN, it is possible, during telephone communication service between telephone units, to switch said service and to transmit image data or text data to the same network terminal. In such case, a request for change of service is given to the network 201 from the telephone unit in the communication service, in response to the actuation of the change-of-service request key 257a thereof, and, in response to said request, the network 201 suspends the telephone communication service and newly sets a call between the facsimile apparatus. Thus the facsimile apparatus having a document to be transmitted effects the data communication During this operation, the communication channel between the telephone units is maintained in the suspended state, and, upon completion of the data communication between the facsimile apparatus, the exchange unit of the network cancels said suspended state, thereby enabling the telephone communication. However, during this period, the telephone units have to maintain the off-hook suspended state. During such disabled communication, the service change lamp 256b of the telephone unit is turned on, thus indicating that the change-of-service function is in progress. In this manner it is rendered possible to connect the telephone unit in the suspended state with another or to disconnect the suspended state by mistake.

FIGS. 19A to 19E show the sequence in the change-of-service process in the transmitting and receiving terminals and the network.

Figure 19A:
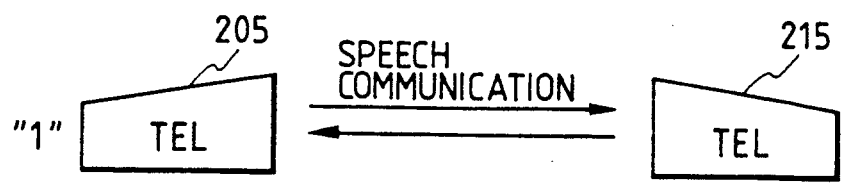
FIGS. 19A to 19E are views showing the sequence of the change-of service function in the third embodiment.
Figure 19B:
Figure 19C:
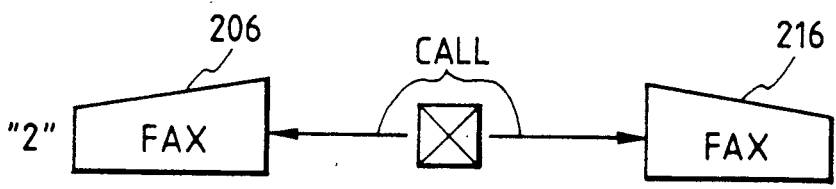
Figure 19D:
Figure 19E:

FIG. 19A shows the telephone communication state between the telephone units 205 and 215. In this state the call number specific to the ISDN is assumed to be "1". When the change of service is requested in this state by the transmitting side and/or the receiving side, a facility request command is sent to the receiving side, a facility request command is sent to the network 201 by the actuation of the change-of-service request key 257a as shown in FIG. 19B, In this state the call number "1" is retained, and a new call number "2" is set as shown in FIG. 19C. The facility request shown in FIG. 19B contains a parameter indicating the facsimile apparatus, and, in response; the network 201 makes a call and a connection to the facsimile apparatus. Calls are simultaneously made to the facsimile apparatus 206, 216 thereby establishing a communication channel therebetween. During the period of aforementioned disabled communication, the service change lamp 256b of the telephone unit si turned on, indicating that the change-of-service function is in progress. Among the facsimile apparatus 206, 216, the one having a document to be transmitted executes the data transmission. Otherwise, the data transmission is executed by the side that has selected the change of service. Upon completion of the data communication, the suspended call number "1" is revived as shown in FIG. 19E, whereby the communication between the telephone units 205, 215 is restored. However, if the handset of the telephone unit is returned to the hook, the call is not revived as in the foregoing embodiment.

Now reference is made to a flow chart shown in FIG. 20, for explaining the details of the communication control in the present embodiment explained above.

At first, in a step S81, the calling side enters a destination telephone number by actuating telephone numbers keys (or turning a dial) of the operation unit 257 of the telephone unit. The telephone number signal generating unit 255 generates telephone number signals (DTMF signals or dial pulse signals) corresponding to the entered telephone number, thereby establishing a call between the terminates (for example between the telephone units 205 and 215). At the same time, the network 201 sets a call number for this call.

Thus the communication is enabled, and the telephone communication between the telephone units is executed in steps S82 to S84. The step S83 discriminates whether the change of service, for example the request for the change of service made by the change-of-service request key 257a of the telephone unit (for communication between the facsimile apparatus) is desired from either or both sides, and the step S84 discriminates whether the communication is terminated by the returning of the handset 252 to the hook.

In the absence of the request for the change of service and the returning of the handset to the hook, the sequence returns to the step S82. On the other hand, in the presence of the request for the change of service, the sequence proceeds to a step S90.

The step S90 interrupts the telephone service, whereby the communication between the telephone units is disabled. In a succeeding step S91, the transmitting telephone unit 205 sends the facility request command, with a parameter for the change of service, to the network 201. Then a step S92 turns on the service change lamp 256b of the external information unit 256, thereby informing the user of a fact that the change-of-service function is in progress. Then a succeeding step S93 causes the RAM 254 to store the call number, in preparation for the revival of call. Then a step S94 inspects the termination of the facsimile communication, or the revival of call, and, in response to the termination of the facsimile communication informed from the network 201, the sequence proceeds to a step S95, which, in response, turns off the service change lamp 256b of the external information unit 256 which was turned on in the step S92, and turns on a lamp of the external information unit 256 indicating the revival of call, simultaneously giving an alarm for example by a bell sound. Then a step S96 discriminates whether the handset 252 is on hook or off hook. If it is in the off-hook state, indicating the intention to continue the telephone communication, the sequence proceeds to a step S97 for retaining the communication state, and then returns to the step S96. This state is retained until the handset is returned to the hook.

On the other hand, if the step S96 discriminates that the handset 252 of the telephone unit is returned to the hook, indicating the absence of necessity for the revival of call in the change-of-service function, the sequence proceeds to a step S85 for executing a call disconnecting process such as liberating the channel, thereby terminating all the process.

In the embodiment explained above, the communication apparatus is provided with a function of informing the user of the transfer to the change-of-service function, whereby the user can know of such transfer. Also the user can understand, in the course of such change-of-service function, why the communication is disabled, and eventual misuse by the user can be prevented during such disabled communication in the course of the change-of-service function.

In the following there will be explained an embodiment of the communication apparatus capable, at the termination of the data communication in the change-of-service function, of automatically informing said termination by a voice message.

In the present embodiment there are provided call setting means for setting a call through a data communication network, data transmission means for transmitting data to a terminal selected by said call setting means, information means for transmitting a voice message to said data communication network, and memory means storing a voice message, wherein said information means transmits the voice message after the completion of data transmission by said data transmission means. In this manner the voice message, stored in said memory means and indicating that said data have been transmitted, is sent to a partner terminal capable of receiving such voice message.

In the following the present embodiment will be clarified in more detail, with reference to the attached drawings.

Figure 21:
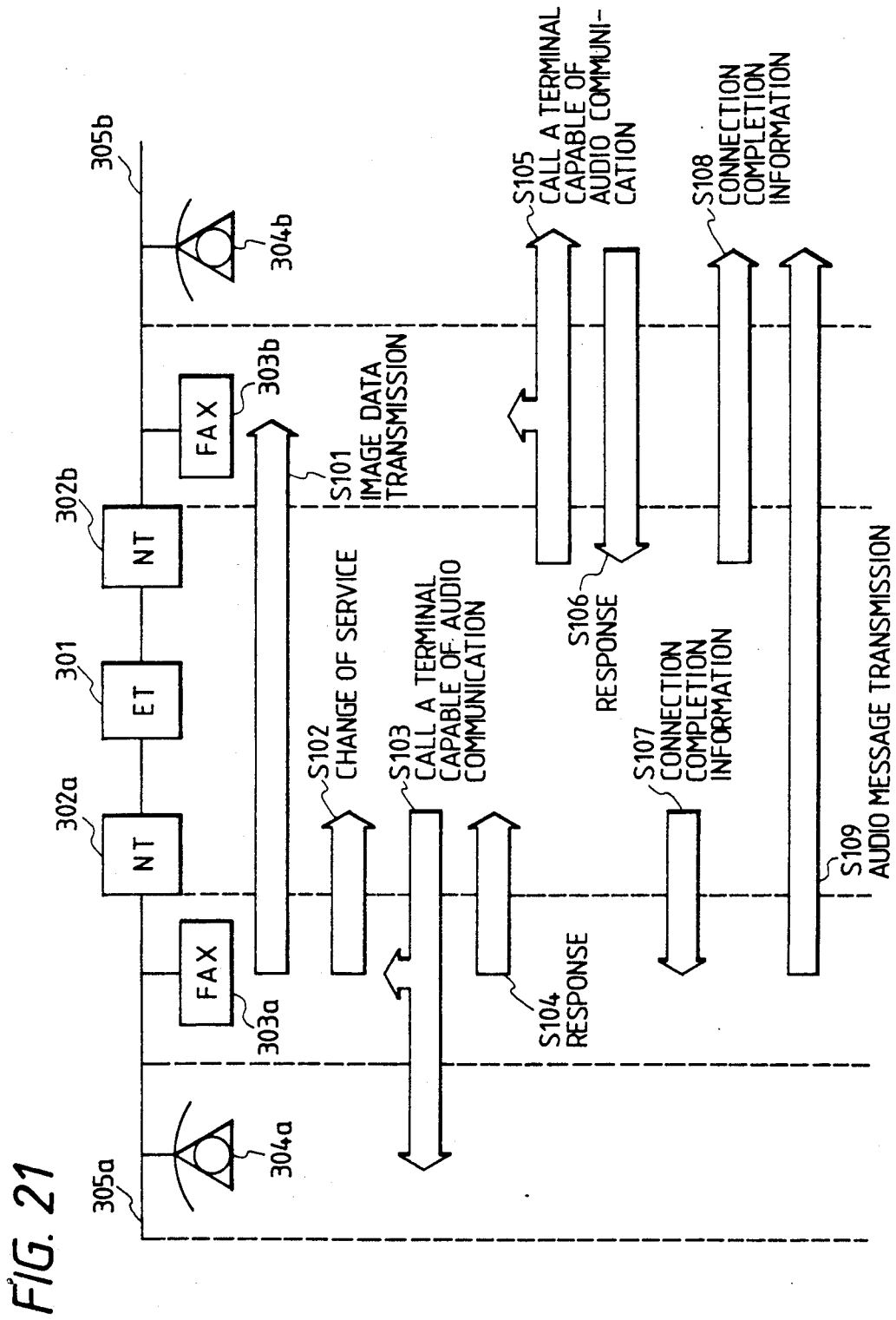
FIG. 21 is a chart showing the structure of an ISDN constituting a fourth embodiment of the present invention, and the connection sequence of the change-of-service function thereof.

FIG. 21 shows the structure of ISDN and the connection control procedure therein in the present embodiment.

In FIG. 21 there are shown an integrated service digital network (ISDN) 301 for effecting exchange services for digital data such as image data, character codes and voice data network terminals (NT) 302a, 302b constituting interfaces for connecting the ISDN with bus channels 305A, 305B each of which is connected to plural terminals such as facsimile apparatus, telephone units and teletex apparatus; group-4 (G4) facsimile apparatus 303a, 303b; and digital telephone units 304a, 304b.

In the ISDN, each of the bus channels 305a, 305b of the network terminals 302a, 302b can be connected to eight terminals at maximum. In the present embodiment there is given an example in which two terminals are connected respectively to the calling side and the receiving side. In FIG. 21 it is assumed that the facsimile apparatus 303a and the telephone unit 304a constitute the calling side, and the facsimile apparatus 303b and the telephone unit 304b constitute the receiving side.

Figure 22:
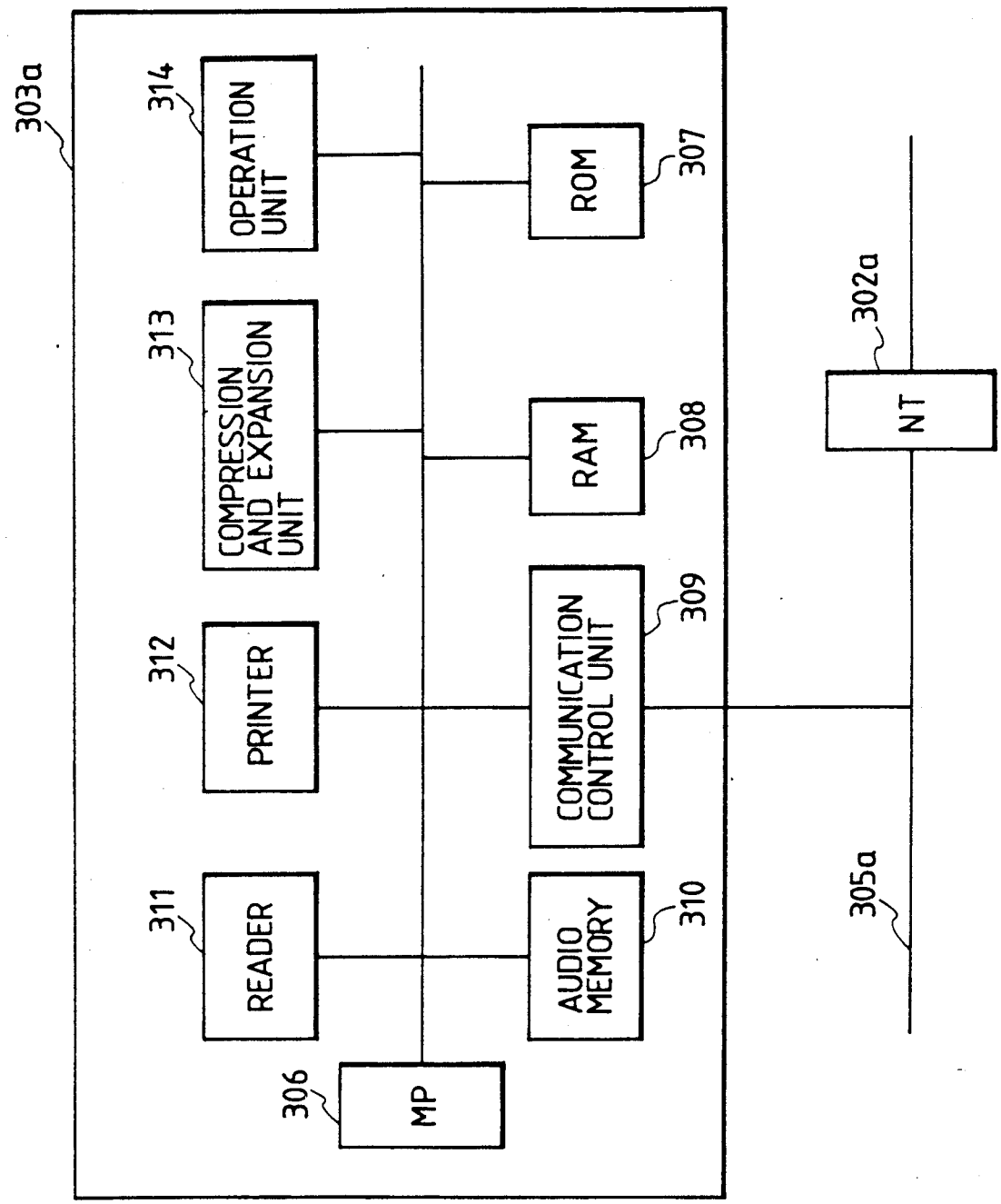
FIG. 22 is a block diagram showing the details of a facsimile apparatus 303a shown in FIG. 21.

FIG. 22 is a block diagram showing the details of the facsimile apparatus 303a shown in FIG. 21, wherein shown are a microprocessor 306 for controlling the entire facsimile apparatus: a ROM 307 storing a main program for operating the micro processor 306, a program for connection control, and a program to be executed in a flow chart shown in FIG. 23; a RAM 308 constituting a work memory for the microprocessor 306; a communication control unit 309 for connection control between the bus channel 305a and the facsimile apparatus: a voice memory 310 storing a message that image data have been transmitted, to be sent to a partner communication terminal capable of receiving voice message, such as the telephone unit 304b shown in FIG. 21 after the completion of the transmission of image data a reader 311 for reading image information such as a document to be transmitted; a printer 312 for reproducing the image from the transmitted data; a compression/expansion unit 313 for compressing the image data read by the reader 311 for example by MMR encoding, or expanding the received image data and an operation unit 314 for designating the destination of data transmission or selecting the voice message transmission after the completion of said data transmission.

In the following there will be explained the function of the present embodiment, with reference to the connection control procedure shown in FIG. 21.

At first, in a step S101, the image data read by the reader 311 of the calling facsimile apparatus are compressed in the compression/expansion unit 313, and are transmitted to the receiving facsimile apparatus 303b through the communication control unit 309, bus channel 305a, network terminal 302a, ISDN 301, network terminal 302b, and bus channel 305b.

Upon completion of the transmission of all the image data, the operator of the facsimile apparatus 303a enters, from the operation unit 314, that the voice data are transmitted by the change-of-service function.

In the following there will be explained the change-of service function. As explained before, in the ISDN, each bus channel can be connected, at maximum, to eight terminals that may be of different properties of data, such as telephone units only handling voice data, facsimile apparatus handling image data, teletex apparatus handling character data etc. Therefore, in the communication through ISDN, the property of the data is informed from the calling side to the ISDN, whereby the communication is received with a terminal of the receiving side with a coinciding property.

The change-of-service function is used in case of changing the property of the data. Thus, if the property is changed to image data by the change-of-service function in the course of telephone communication to a partner telephone unit, it is possible to transmit the image data to a facsimile apparatus connected to the same bus channel of said partner telephone unit, without redialling.

In a step S102, an input from the operation unit 314 informs the ISDN of a fact that voice data are to be transmitted in the change-of-service function. In response, the ISDN calls, in a step S103, a terminal capable of voice communication. In the present example, the telephone unit 304a connected to the bus channel 305a is capable of such voice communication, and the facsimile apparatus 303a is also capable of voice communication from the voice memory 310. Therefore, a call is made to said telephone unit 304a and facsimile apparatus 303a.

In a step S104, the facsimile apparatus 303a makes a response. This is because said facsimile apparatus 303a has the voice memory 310, and the system is constructed in such a manner that the facsimile apparatus 303a automatically responds to the call in the step S103. Also, at the side of the network terminal 302b, a connection is made to a terminal capable of voice communication, in steps S105 and S106.

It is to be noted that, the operator at the side of the network terminal 302b can respond to the call from the ISDN by means of the telephone unit 304b even he is not located close to the facsimile apparatus 303b.

Steps S107, S108 inform the completion of connection respectively to the network terminals 302a, 302b, and a step S109 executes the transmission of the voice message stored in the voice memory 310 of the facsimile apparatus 303a.

Said voice message indicates the transmission of the image data in the step S101, such as "Data have been sent to the facsimile apparatus".

Figure 23B:
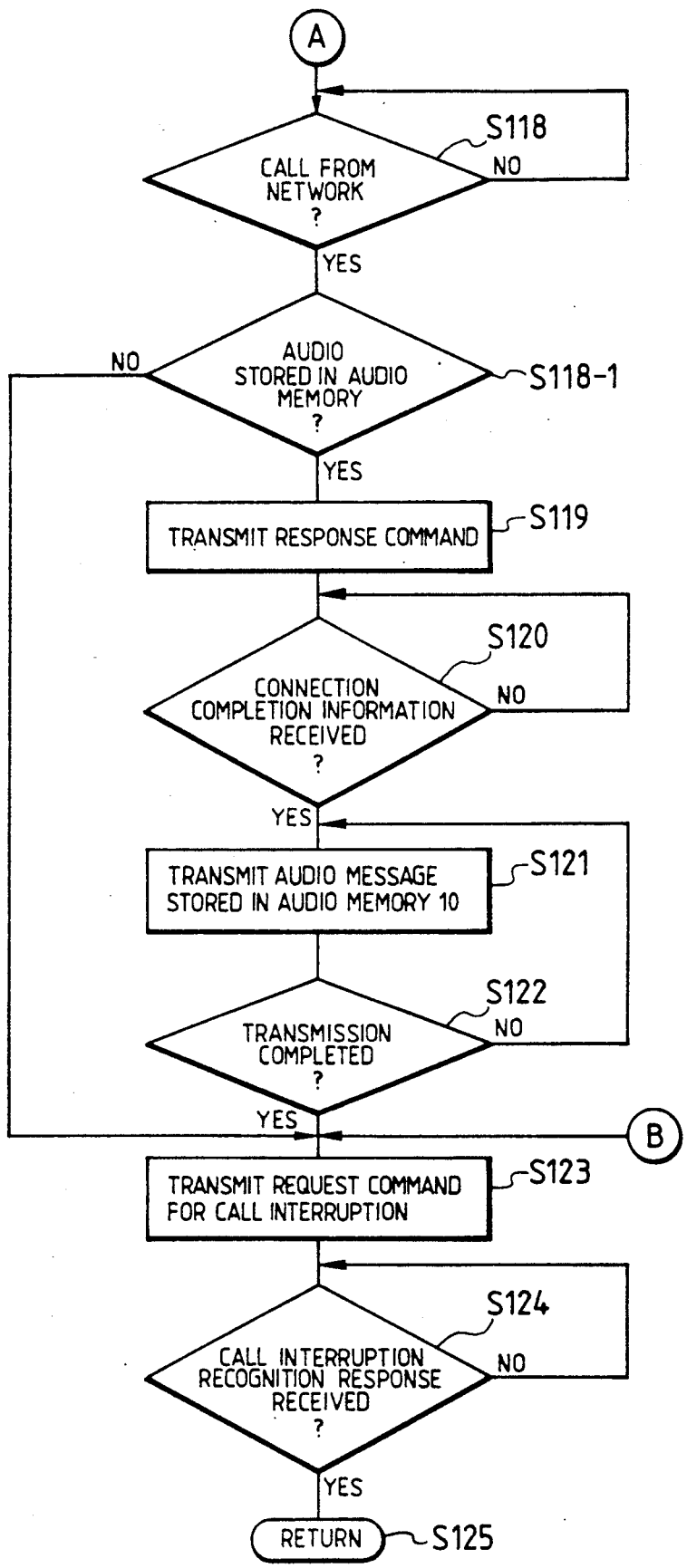

FIGS. 23A and 23B are flow charts to be executed by the microprocessor 306 shown in FIG. 22. In the following there will be explained the function of the facsimile apparatus 303a, with reference to said flow chart.

At first a step S110 sends the identification data of the receiving side and the property data to the network in preparation for the image data transmission, and requests a call.

When a connection is made with a terminal capable of receiving the image data at the receiving side, the network sends information of completed connection to the calling facsimile apparatus 303a. Thus a step S111 discriminates the reception of said information. If said information is received, a step S112 executes the image data transmission. A step S113 discriminates whether the transmission of all the image data has been completed, and, if completed, the sequence proceeds to a step S114.

The step S114 discriminates whether the change-of-service function is requested from the operation unit 314, and, if not requested, the sequence proceeds to a step S123 to disconnect the call. If the change of service is requested, a step S115 discriminates the property entered from the operation unit 314. The sequence proceeds to a step S117 if the requested property is voice, but the sequence proceeds to a step S200 for effecting respective processes if the property is otherwise.

The step S117 sends, to the network, a command for requesting the change-of-service function for the transmission of voice data. Then a step S118 discriminates whether a call has been made from the network to a voice data terminal. A step S118-1 discriminates whether voice data are stored in the voice memory 310, and, if stored, a step S119 transmits a response command. On the other hand, if the step S118-1 identifies the absence of storage of the voice data, the sequence proceeds to a step S123 to disconnect the call. When a connection is made with a terminal capable of receiving the voice data at the receiving side, the network sends information of completed connection to the facsimile apparatus. Thus a step S120 discriminates whether said information has been received, and, if received, a step S121 executes the transmission of the voice message stored in the voice memory 310.

When a step S122 discriminates the completion of voice message transmission, a step S123 sends a command for requesting disconnection of the call to the network. Then a step S124 discriminates whether a response confirming the disconnection has been received, and, if received, a stand-by state is assumed in a step S125.

As explained in the foregoing, the present embodiment enables automatic voice information, indicating the data transmission to the facsimile apparatus of the destination, by means of the change-of-service function of the ISDN, so that the operator of the transmitting side can securely inform the data transmission through a simple operation.

Also the operator of the receiving side can receive the voice message not only by the telephone unit of the facsimile apparatus but also by a nearby telephone unit, so that he can recognize the data transmission to the facsimile apparatus even if he is not located close to said apparatus.

In the above-explained embodiment the voice message is sent from the voice memory attached to the facsimile apparatus 303a, but it is also possible to provide the telephone unit 304a with the voice memory and to transmit said voice message from the telephone unit 304a by means of the change-of-service function after the image data transmission from the facsimile apparatus 303a.

It is furthermore possible to select the change-of-service function during the image data transmission or in advance prior to said transmission, and to execute the change of service after said data transmission thereby sending the voice message In such case the operator of the transmitting side need not operate the system after the data transmission.

As explained in the foregoing, the present embodiment enables the provision of a voice message, indicating the data transmission, after the completion thereof by means of a simple operation. Also the operator of the receiving side can immediately know the data reception at the facsimile apparatus even if he is not located close thereto.

The present invention has been explained by preferred embodiments thereof, but the present invention is not limited to such embodiments and is subject to various modifications within the scope and spirit of the appended claims

What is claimed is:

1. A communication system comprising:
 a first station wherein a first terminal and a second terminal are connected on a first subscriber's line, attribution of the first terminal being different from attribution of the second terminal;
 a second station wherein a third terminal and a fourth terminal are connected on a second subscriber's line, attribution of the third terminal being different from attribution of the fourth terminal; and
 an integrated services digital network for connecting said first station and said second station,
 wherein said second terminal comprises:
 memory means for storing data to be transmitted when said first terminal requests a communication;
 discrimination means for discriminating whether or not said first terminal requests the communication in a state where said first terminal and said third terminal are connected to use a line; and
 transmission means for automatically transmitting, when said discrimination means discriminates that said first terminal requests the communication, the data stored in said memory means to said fourth terminal in said second station by using said line which had been used by said first and third terminals.

2. A system according to claim 1, wherein said discrimination means discriminates that said first terminal requests the communication by receiving a communication request from said first terminal through said integrated services digital network.

3. A system according to claim 1, wherein said first and third terminals are telephone sets which perform the communication of audio data, and said second and fourth terminals are data communication terminals which perform the communication of data other than audio data.

4. A system according to claim 1, wherein said memory means stores transmission data together with discrimination data of a communication partner, and said transmission means transmits to said fourth terminal data representing said fourth terminal from among the data stored in said memory means when said first terminal requests the communication.

5. A communication system comprising:
 an integrated services digital network (ISDN) having a plurality of channels;
 first and second terminals connected to a first subscriber's line of said ISDN, attribution of said second terminal; and
 third and fourth terminals connected to a second subscriber's line of said ISDN, attribution of said third terminal being different from attribution of said fourth terminal,
 wherein said first terminal informs said ISDN that attribution is switched from said first terminal to said second terminal in a case where said first and third terminals are connected to use one channel of said ISDN,
 said ISDN calls said second and fourth terminals on the basis of the information of switching the attribution, and
 said second terminal called by said ISDN automatically transmits the data to said fourth terminal by using the channel which had been used by said first and third terminals.

6. A system according to claim 5, wherein said second terminal further comprises storage means for previously storing the data to be transmitted when said second terminal is called by said ISDN.

7. A system according to claim 5, wherein said first and third terminals are telephone sets for communicating an audio signal, and said second and fourth terminals are facsimile apparatuses for communicating image data.

8. A system according to claim 7, wherein when said first terminal informs said ISDN that the attribution is switched from the audio signal to the image data, said ISDN calls the facsimile apparatuses of said second and fourth terminals according to the information from said first terminal and said second terminal called by said ISDN automatically transmits the image data to said fourth terminal.

9. A system according to claim 5, wherein said first and third terminals are facsimile apparatuses for communicating image data, and said second and fourth terminals are telephone sets for communicating an audio signal.

10. A system according to claim 9, wherein when said first terminal informs said ISDN that the attribution is switched from the image data to the audio signal, said ISDN calls said telephone sets of said second and fourth terminals according to the information from said first terminal, and said second terminal called by said ISDN automatically transmits the audio signal to said fourth terminal.

11. A communication system comprising:
 a first station wherein first and second terminals are connected on a first subscriber's line;
 a second station wherein third and fourth terminals are connected on a second subscriber's line; and
 an integrated services digital network (ISDN) having a plurality of channels for connecting said first station to said second station,
 wherein said first terminal comprises:
 communication means for performing a communication to said third terminal in said second station through one channel of said ISDN;
 switch means for switching a communication service for said second terminal so as to use said one channel for communication between said second and fourth terminals;
 detection means for detecting that the communication service has been returned after the communication between said second and fourth terminals is completed, in response to a call from said ISDN;
 selection means for selecting one of connection and disconnection of the channel to said second station when the communication service has been returned; and
 disconnection means for disconnecting the channel when said detection means detects that the communication service has been returned in response to disconnection of the channel being selected by said selection means.

12. A system according to claim 11, wherein said first and third terminals are telephone sets which perform the communication of audio data, and said second and fourth terminals are data communication terminals which perform the communication of data other than audio data.

13. A system according to claim 11, wherein said first terminal further comprises informing means for performing an informing operation when it is detected by said detection means that the communication service has been returned, and said disconnection means disconnects the channel after the informing operation by said informing means is completed.

14. A communication system comprising:
a first station wherein first and second terminals are connected on a first subscriber's line;
a second station wherein third and fourth terminals are connected on a second subscriber'lines; and
an integrated services digital network (ISDN) having a plurality of channels for connecting said first station to said second station,
wherein said first terminal comprises:
communication means for performing a communication to said third terminal in said second station through one channel of said ISDN;
switch means for switching a communication service of said ISDN to said second terminal so as to use said channel for communication between said second and fourth terminals;
display means for displaying that the communication service has been switched to said second terminal by said switch means; and detection means for detecting that the communication service has been returned from said second terminal after the switching of the communication service to said second terminal by said switch means is completed,
wherein said display means continues the display until said detection means detects that the communication service has been returned.

15. A communication system comprising:
an integrated services digital network (ISDN) having a plurality of channels;
first and second terminals connected to a first subscriber's line of said ISDN, attribution of said first terminal being different from attribution of said second terminal; and
third and fourth terminals connected to a second subscriber's line of said ISDN, attribution of said third terminal being different from attribution of said fourth terminal;
wherein said first terminal informs said ISDN that attribution is switched from said first terminal to said second terminal in a case where said first and third terminals are connected to use one channel of said ISDN,
said ISDN calls said second and fourth terminals on the basis of the information of switching the attribution,
said second terminal called by said ISDN automatically transmits data to said fourth terminal by using the channel which had been used by said first and third terminals, and
said first terminal informs that said second terminal is in communication to said fourth terminal.

* * * * *

UNITED STATES PATENT AND TRADEMARK OFFICE
CERTIFICATE OF CORRECTION

PATENT NO. : 4,995,073

DATED : February 19, 1991

INVENTOR(S) : NAOYUKI OKADA ET AL.

It is certified that error appears in the above-identified patent and that said Letters Patent is hereby corrected as shown below: Title page:

AT [19] Inventors:

"Okata et al." should read --Okada et al.--.

AT [75] INVENTORS

"Naoyuki Okata," should read --Naoyuki Okada,--.

UNITED STATES PATENT AND TRADEMARK OFFICE
CERTIFICATE OF CORRECTION

PATENT NO. : 4,995,073
DATED : February 19, 1991
INVENTOR(S) : NAOYUKI OKATA, ET AL.

It is certified that error appears in the above-identified patent and that said Letters Patent is hereby corrected as shown below:

Title page:

IN [30] FOREIGN APPLICATION PRIORITY DATA

"Oct. 10, 1987  [JP]  Japan ............. 62-264623" should read --Oct. 19, 1987  [JP]  Japan ......... 62-264623--.

COLUMN 1

Line 47, "m" should read --maximum--.

COLUMN 8

Line 6, "to" should be deleted.

COLUMN 11

Line 14, "maxi" should read --maxi- --.
Line 19, "a telephone unit 207" should be deleted.
Line 46, "207" should read --telephone 207--.

COLUMN 12

Line 26, "receiving side," should be deleted.
Line 27, "a facility request command is sent to the" should be deleted.
Line 61, "terminates" should read --terminals--.

COLUMN 14

Line 13, "data network" should read --data; network--.
Line 15, "bus channels 305A, 305B" should read --bus channels 305a, 305b--.

UNITED STATES PATENT AND TRADEMARK OFFICE
CERTIFICATE OF CORRECTION

PATENT NO. : 4,995,073
DATED : February 19, 1991
INVENTOR(S) : NAOYUKI OKATA, ET AL.

It is certified that error appears in the above-identified patent and that said Letters Patent is hereby corrected as shown below:

COLUMN 17

Line 53, "said sec-" should read --said first terminal being different from attribution of said sec- --.

COLUMN 19

Line 13, "subscriber'lines;" should read --subscriber's line;--.
    Line 29, "and detection" should read --and ¶ detection--.

Signed and Sealed this

Fourth Day of May, 1993

Attest:

MICHAEL K. KIRK

*Attesting Officer*     *Acting Commissioner of Patents and Trademarks*